US011893705B2

(12) United States Patent
Karasawa

(10) Patent No.: US 11,893,705 B2
(45) Date of Patent: Feb. 6, 2024

(54) REFERENCE IMAGE GENERATION APPARATUS, DISPLAY IMAGE GENERATION APPARATUS, REFERENCE IMAGE GENERATION METHOD, AND DISPLAY IMAGE GENERATION METHOD

(71) Applicant: Sony Interactive Entertainment Inc., Tokyo (JP)

(72) Inventor: Yuki Karasawa, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/684,101

(22) Filed: Mar. 1, 2022

(65) Prior Publication Data

US 2022/0270205 A1   Aug. 25, 2022

Related U.S. Application Data

(62) Division of application No. 16/980,004, filed as application No. PCT/JP2018/014475 on Apr. 4, 2018, now Pat. No. 11,308,577.

(51) Int. Cl.
*G06T 3/20* (2006.01)
*G06T 7/90* (2017.01)

(52) U.S. Cl.
CPC .......... *G06T 3/20* (2013.01); *G06T 7/90* (2017.01); *G06T 2207/10024* (2013.01)

(58) Field of Classification Search
CPC ... G06T 3/20; G06T 7/90; G06T 2207/10024; G02B 2027/014; H04N 13/111
See application file for complete search history.

(56) References Cited

U.S. PATENT DOCUMENTS 8,619,082 B1 * 12/2013 Ciurea ................. H04N 13/232
382/154
2006/0028489 A1   2/2006 Uyttendaele et al.
2006/0120590 A1 * 6/2006 Han ..................... F41G 7/2293
382/103

(Continued)

FOREIGN PATENT DOCUMENTS

EP      1190393 B1 *  5/2005  ............. G06T 15/04
JP   2000-348207 A   12/2000

(Continued)

OTHER PUBLICATIONS

International Search Report and Written Opinion dated Jun. 19, 2018, from the corresponding PCT Application No. PCT/JP2018/014475.

(Continued)

*Primary Examiner* — Sarah Lhymn
(74) *Attorney, Agent, or Firm* — XSENSUS LLP

(57) ABSTRACT

Moving images of a space, which includes objects 34 and 35 of a display target, as viewed from reference points are created in advance as reference images, and they are combined in response to actual positions of the points of view to draw a moving image. When the object 35 is displaced as indicated by an arrow mark in the space, reference points of view 30a to 30e are fixed as depicted in (a). Alternatively, the reference points of view are displaced in response to the displacement like reference points of view 36a to 36e in (b). Then, the moving images from the reference points of view are generated as the reference images.

10 Claims, 24 Drawing Sheets

(56) References Cited

U.S. PATENT DOCUMENTS

| | | | |
|---|---|---|---|
| 2009/0185759 A1* | 7/2009 | Liu | G06T 17/20 |
| | | | 382/284 |
| 2010/0046803 A1* | 2/2010 | Tomita | G06T 3/4038 |
| | | | 382/106 |
| 2012/0141016 A1* | 6/2012 | Wildeboer | H04N 13/111 |
| | | | 382/154 |
| 2013/0321593 A1 | 12/2013 | Kirk Adam et al. | |
| 2015/0091900 A1 | 4/2015 | Yang et al. | |
| 2016/0321820 A1* | 11/2016 | Ely | G06T 7/246 |
| 2017/0308990 A1* | 10/2017 | Middleton | G06T 5/005 |
| 2017/0358092 A1* | 12/2017 | Bleibel | H04N 5/272 |
| 2018/0137331 A1* | 5/2018 | Miyoshino | G06V 10/761 |
| 2019/0094542 A1* | 3/2019 | Langner | G02B 27/0093 |

FOREIGN PATENT DOCUMENTS

| | | |
|---|---|---|
| WO | 00/75873 A1 | 12/2000 |
| WO | 2018/030206 A1 | 2/2018 |

OTHER PUBLICATIONS

International Preliminary Report on Patentability dated Oct. 15, 2020, from the corresponding PCT Application No. PCT/JP2018/014475.

Notice of Reasons for Refusal dated Jun. 8, 2021, from Japanese Patent Application No. 2020-512170.

United States Restriction Office Action dated Sep. 22, 2021, from corresponding U.S. Appl. No. 16/980,004.

United States Office Action dated Oct. 25, 2021, from corresponding U.S. Appl. No. 16/980,004.

United States Notice of Allowance dated Jan. 27, 2022, from corresponding U.S. Appl. No. 16/980,004.

\* cited by examiner

FIG.11

| IDENTIFICATION INFORMATION 272 | POINT-OF-VIEW POSITION COORDINATES 274 | REFERENCE IMAGE 276 | DEPTH IMAGE 278 |
|---|---|---|---|
| A | (xa, ya, za) | VIDEO A | DEPTH VIDEO A |
| B | (xb, yb, zb) | VIDEO B | DEPTH VIDEO B |
| C | (xc, yc, zc) | VIDEO C | DEPTH VIDEO C |
| ⋮ | ⋮ | ⋮ | ⋮ |

270

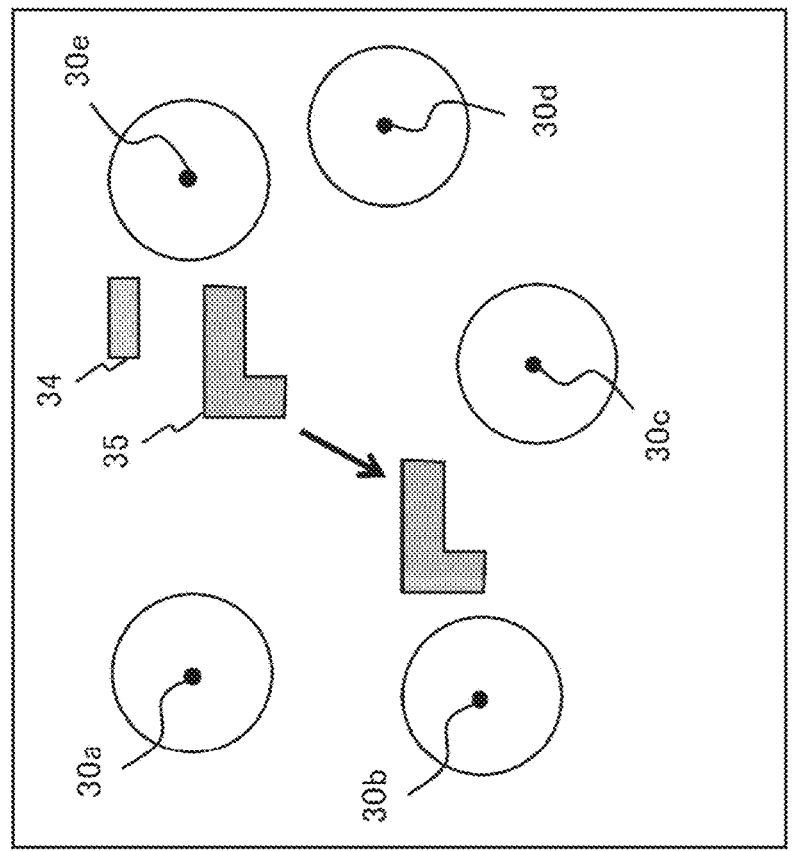
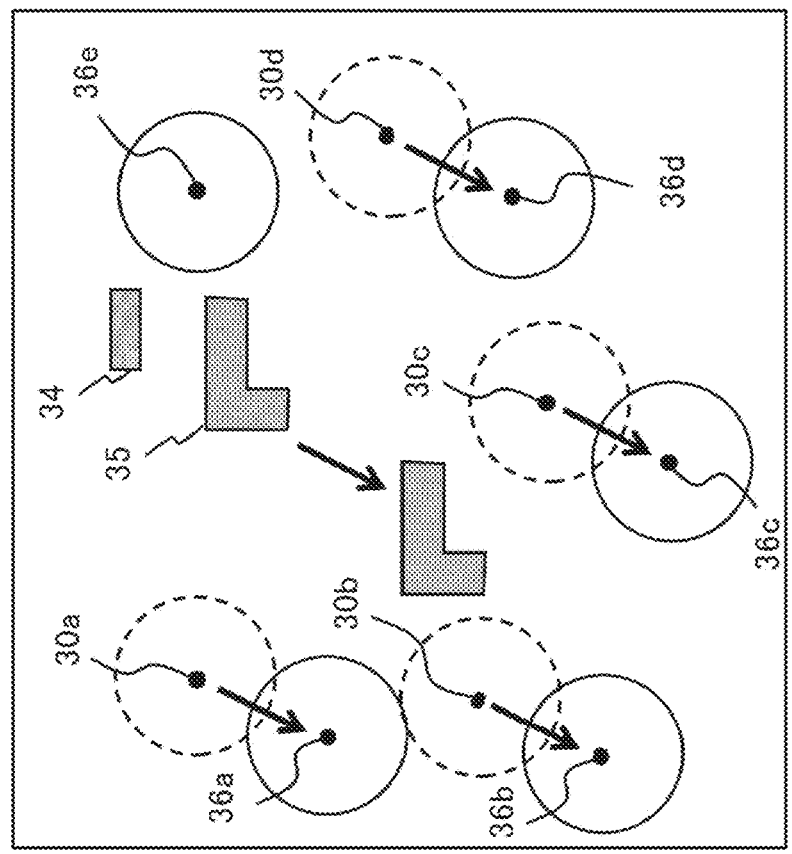
FIG. 12

FIG. 21

| TILE POSITION | FRAME NUMBER | | | | | |
|---|---|---|---|---|---|---|
| | 0 | 1 | 2 | ... | 24 | 25 | ... |
| (0, 0) | | | | — | | | ... |
| (1, 0) | | | | — | | | ... |
| ... | ... | ... | ... | | ... | ... | |
| (30, 50) | IMAGE a | — | — | ... | DIFFERENCE IMAGE a1 | ... | ... |
| (31, 50) | IMAGE b | — | — | ... | — | DIFFERENCE IMAGE b1 | ... |
| ... | | | | ... | | | |
| (70, 65) | IMAGE c | DIFFERENCE IMAGE c1 | DIFFERENCE IMAGE c2 | ... | — | — | ... |
| (71, 65) | IMAGE d | DIFFERENCE IMAGE d1 | — | ... | — | — | ... |
| ... | | | | ... | | | |

350

FIG. 22
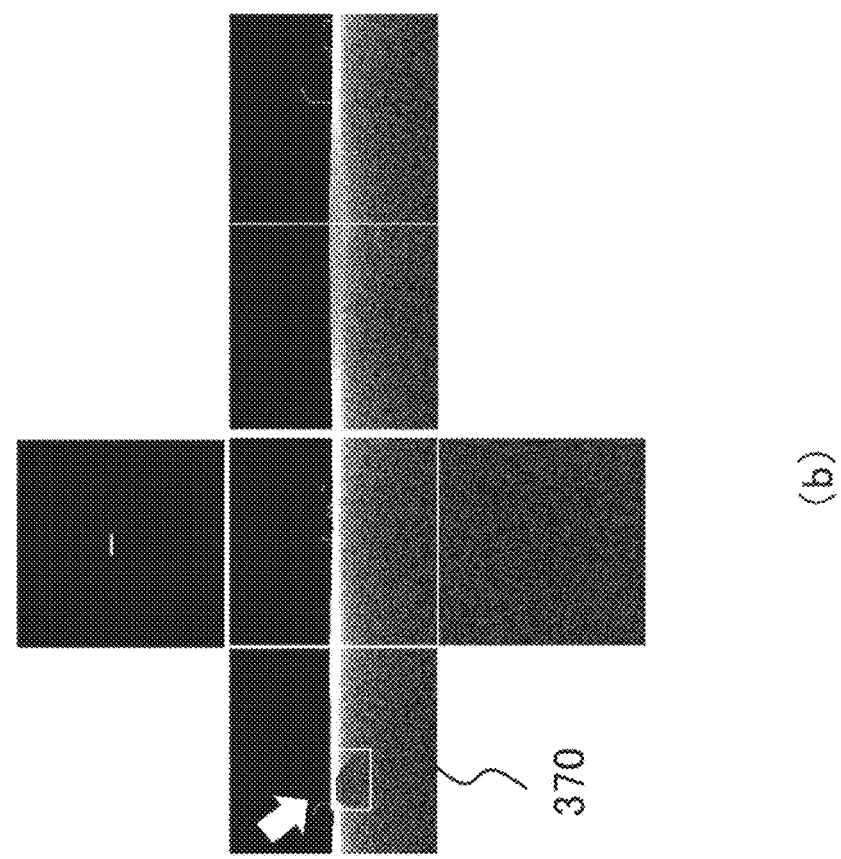
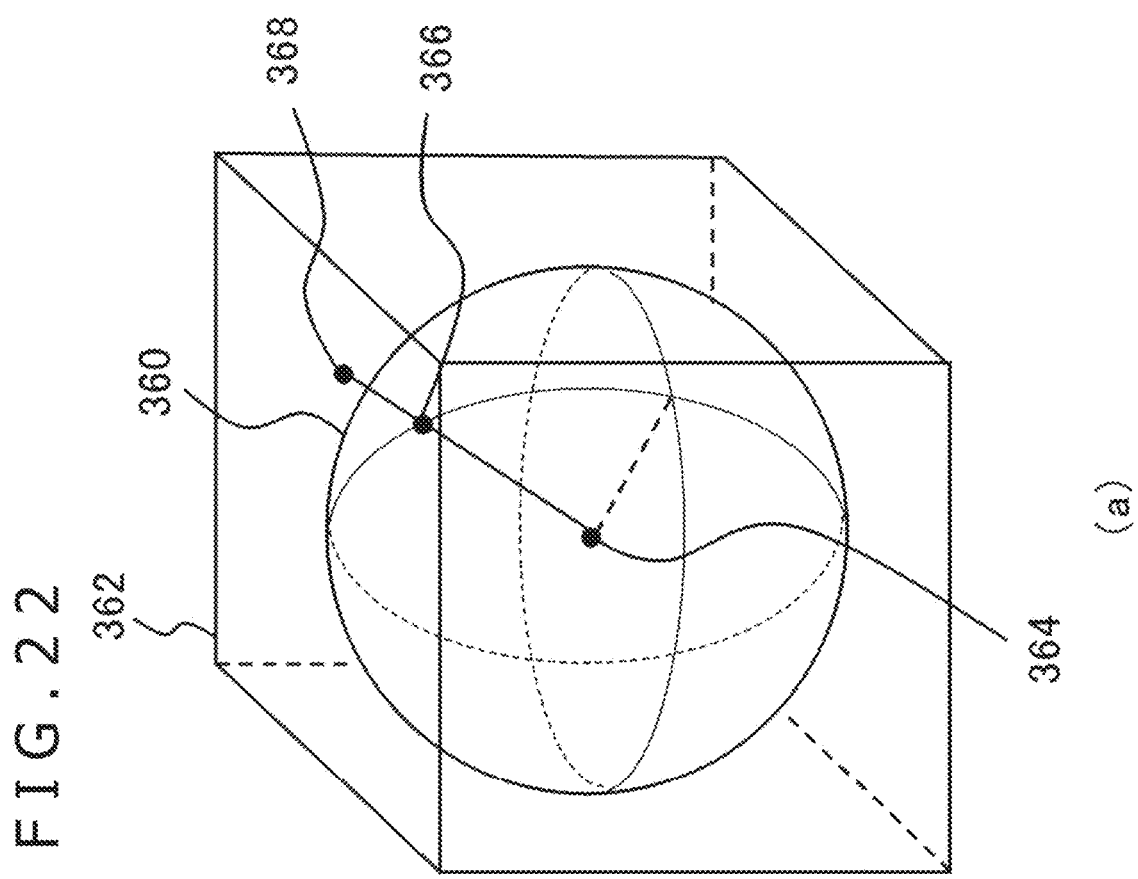

REFERENCE IMAGE GENERATION APPARATUS, DISPLAY IMAGE GENERATION APPARATUS, REFERENCE IMAGE GENERATION METHOD, AND DISPLAY IMAGE GENERATION METHOD

TECHNICAL FIELD

The invention relates to a reference image generation apparatus that generates data to be used to display an image according to a point of view of a user, a display image generation apparatus that generates a display image using the data, a reference image generation method, and a display image generation method by them.

BACKGROUND ART

An image display system that can view a target space from a free point of view is widely used. For example, a system is developed, in which a panoramic video is displayed on a head-mounted display, and when a user wearing the head-mounted display rotates the head, a panoramic image corresponding to the line-of-sight direction is displayed. The head-mounted display can be used to increase a feeling of immersion in a video or to improve the operability of an application such as a game. In addition, a walk-through system is also developed, in which a user wearing a head-mounted display can physically move to virtually walk around the space displayed as a video.

SUMMARY

Technical Problem

In the image display technique that corresponds to the free point of view regardless of the type of display apparatus, high responsiveness is required for the change in display in response to the movement of the point of view. On the other hand, to increase the sense of realism in the image world, the resolution needs to be increased, or complicated calculation needs to be executed. This increases the load of image processing. Therefore, the display does not catch up with the movement of the point of view, and as a result, the sense of realism may be lost.

The present invention has been made in view of the problem, and an object of the present invention is to provide a technique that can attain both of the responsiveness and the image quality of the image display with respect to the point of view.

Solution to Problem

To solve the problem described above, a mode of the present invention relates to a reference image generation apparatus. The reference image generation apparatus that generates data of a reference image to be used to generate a display image when a space including an object of a display target is viewed from any point of view, the reference image representing a picture when the space is viewed from a predetermined reference point of view, includes a space construction unit configured to displace the object in the space in accordance with information that defines displacement of the object, a reference point-of-view setting unit configured to place the reference point of view in the space and displace the reference point of view in response to the displacement of the object, and a reference image data generation unit configured to generate and output the reference image at a predetermined frame rate in a field of view corresponding to the reference point of view.

Another mode of the present invention relates to a display image generation apparatus. The display image generation apparatus includes an object model storage unit configured to store information that defines displacement of an object in a space of a display target, a reference image data storage unit configured to store video data of a reference image representative of a picture when the space including the object is viewed from a reference point of view that is displaced in response to the displacement of the object, a point-of-view information acquisition unit configured to acquire information relating to a point of view of a user, a projection unit configured to represent a picture of the object when the space is viewed from the point of view of the user on a plane of a display image at a predetermined rate, a pixel value determination unit configured to determine, for each pixel in the display image, a color of a picture of the object using a color of a picture of a same object in the reference image, and an output unit configured to output data of the display image.

Furthermore, another mode of the present invention also relates to a display image generation apparatus. The display image generation apparatus includes an object model storage unit configured to store information that defines displacement of an object in a space of a display target, a reference image data storage unit configured to store video data of reference images representative of pictures of the space including the object when the space is viewed from a plurality of predetermined reference points of view, a point-of-view information acquisition unit configured to acquire information relating to a point of view of a user, a projection unit configured to represent the pictures of the objects when the space is viewed from the point of view of the user on a plane of the display image at a predetermined rate, a pixel value determination unit configured to determine, for each pixel in the display image, colors of pictures of the objects using a color of a picture of a same object in the reference image, and an output unit configured to output data of the display image, in which the pixel value determination unit switches the reference image to be referred to in order to determine a color of a picture of the object in response to a position of the object.

Furthermore, another mode of the present invention relates to a reference image generation method. The reference image generation method by a reference image generation apparatus that generates data of a reference image to be used for generation of a display image when a space including an object of a display target is viewed from any point of view, the reference image representing a picture when the space is viewed from a predetermined reference point of view, includes a step of displacing the object in the space in accordance with information that defines displacement of the object, a step of placing the reference point of view in the space and displacing the reference point of view in response to the displacement of the object, and a step of generating and outputting the reference image at a predetermined frame rate in a field of view corresponding to the reference point of view to a memory.

Furthermore, another mode of the present invention relates to a display image generation method. The display image generation method by a display image generation apparatus includes a step of reading out information that defines displacement of an object in a space of a display target from a memory, a step of reading out video data of a reference image representative of a picture when the space including the object is viewed from a reference point of view that displaces in response to the displacement of the object from the memory, a step of acquiring information relating to a point of view of a user, a step of representing a picture of the object when the space is viewed from the point of view of the user on a plane of a display image at a predetermined rate, a step of determining, for each pixel in the display image, colors of pictures of the objects using a color of a picture of a same object in the reference image, and a step of outputting data of the display image.

Furthermore, another mode of the present invention relates to a display image generation method. The display image generation method includes an object model storage unit configured to store information that defines displacement of an object in a space of a display target, a reference image data storage unit configured to store video data of reference images representative of pictures when the space including the object is viewed from a plurality of predetermined reference points of view, a point-of-view information acquisition unit configured to acquire information relating to a point of view of a user, a projection unit configured to represent the pictures of the objects when the space is viewed from the point of view of the user on a plane of a display image at a predetermined rate, a pixel value determination unit configured to determine, for each pixel in the display image, colors of the pictures of the objects using a color of a picture of a same object in the reference image, and an output unit configured to output data of the display image, in which the pixel value determination unit switches the reference image to be referred to in order to determine a color of a picture of the object in response to a position of the object.

Note that any combination of the constituent elements and things obtained by converting the expression of the present invention between a method, an apparatus, a system, a computer program, a data structure, a recording medium, and the like are also effective as modes of the present invention.

Advantageous Effect of Invention

According to the present invention, both of the responsiveness and the image quality of the image display with respect to the point of view can be attained.

BRIEF DESCRIPTION OF DRAWINGS

FIG. 11 is a diagram illustrating an example of a structure of data stored in a reference image data storage unit in the present embodiment.

FIG. 12 is a diagram illustrating an example setting a reference point of view for representing an object having some movement in the present embodiment.

FIG. 21 is a diagram illustrating an example of a structure of data after compression in a mode in which a compression process of a reference image and a depth image is controlled in a unit of a tile image in the present embodiment.

FIG. 22 is a diagram for describing an example of a data compression process in a case where an omnidirectional image of a reference image and a depth image is represented by a cube map in the present embodiment.

DESCRIPTION OF EMBODIMENT

In the present embodiment, an image is basically displayed in a field of view according to a point of view of a user.

In that sense, the type of apparatus that displays the image is not particularly limited, and the apparatus may be any one of a wearable display, a flat-plate display, a projector, and the like. Here, an example of a head-mounted display among the wearable displays will be described.

In a case of the wearable display, a line of sight of the user can be substantially estimated by a built-in motion sensor. In cases of other display apparatuses, the line of sight can be detected as the user wears the motion sensor on the head, or a gaze point detection apparatus can be used to detect the line of sight. Alternatively, markers may be provided on the head of the user, and an image of the user may be captured to estimate the line of sight by analyzing the image. These techniques may also be combined.

Figure 1:
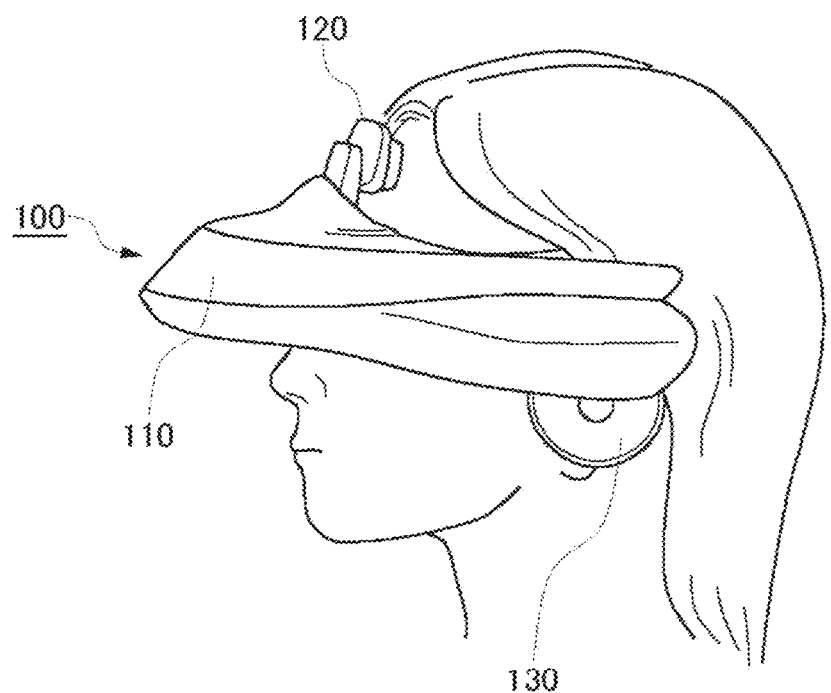
FIG. 1 is a diagram illustrating an example of exterior of a head-mounted display of the present embodiment.

FIG. 1 illustrates an example of exterior of a head-mounted display 100. The head-mounted display 100 includes a body unit 110, a frontal region contact unit 120, and a temporal region contact unit 130. The head-mounted display 100 is a display apparatus installed on the head of the user to view still images, moving images, and the like displayed on a display and to listen to sound, music, and the like output from a headphone. A built-in or external motion sensor of the head-mounted display 100 can measure posture information, such as a rotation angle and a tilt of the head of the user wearing the head-mounted display 100.

The head-mounted display 100 is an example of a "wearable display apparatus." Examples of the wearable display apparatus include not only the head-mounted display 100 in a narrow sense, but also any wearable display apparatuses, such as glasses, a glasses-type display, a glasses-type camera, a headphone, a headset (headphone with microphone), an earphone, an earring, an ear hook camera, a hat, a hat with camera, and a headband.

Figure 2:
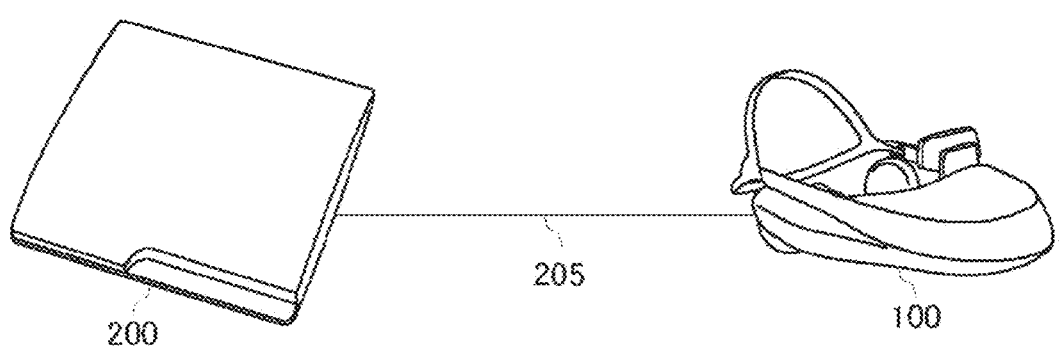
FIG. 2 is a configuration diagram of an image processing system of the present embodiment.

FIG. 2 illustrates a configuration diagram of an image processing system according to the present embodiment. The head-mounted display 100 is connected to a display image generation apparatus 200 through an interface 205 for connecting a peripheral device of wireless communication, a USB (Universal Serial Bus), or the like. The display image generation apparatus 200 may be further connected to a server through a network. In that case, the server may provide data of the image displayed on the head-mounted display 100 to the display image generation apparatus 200.

The display image generation apparatus 200 specifies the position of the point of view and the direction of the line of sight based on the position and the posture of the head of the user wearing the head-mounted display 100. The display image generation apparatus 200 generates a display image such that the field of view corresponds to the position of the point of view and the direction of the line of sight and outputs the display image to the head-mounted display 100. In that sense, there can be various purposes of displaying the images. For example, the display image generation apparatus 200 may advance an electronic game and generate a display image of a virtual world that is the stage of the game or may display moving images or the like to be enjoyed regardless of whether the world is a virtual world or a real world. In a case where the display apparatus is a head-mounted display, a state immersed into the display world can also be produced by displaying a panoramic image in a wide range of angle around the point of view.

Figure 3:
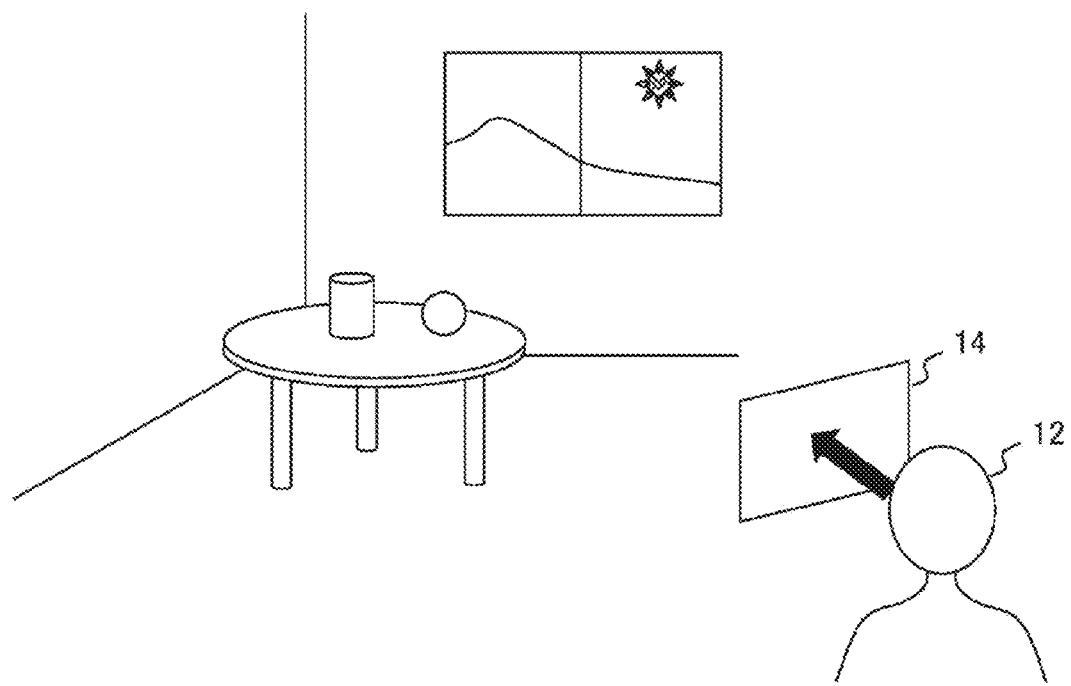
FIG. 3 is a diagram for describing an example of an image world displayed, on the head-mounted displayed, by a display image generation apparatus of the present embodiment.

FIG. 3 is a diagram for describing an example of an image world displayed by the display image generation apparatus 200 on the head-mounted display 100 in the present embodiment. In the state created in the example, a user 12 is in a room that is a virtual space. In a world coordinate system defining the virtual space, objects, such as walls, a floor, a window, a table, and things on the table, are arranged as illustrated in FIG. 3. The display image generation apparatus 200 defines a view screen 14 in the world coordinate system according to the position of the point of view and the direction of the line of sight of the user 12 and projects an image of the objects to the view screen 14 to thereby draw a display image.

The position of the point of view and the direction of the line of sight of the user 12 (hereinafter, they may be comprehensively referred to as "point of view") can be acquired at a predetermined rate, and the position and the direction of the view screen 14 can be changed accordingly to display an image in the field of view corresponding to the point of view of the user. Stereo images with parallax can also be generated and displayed in front of the left and right eyes in the head-mounted display 100 to stereoscopically display the virtual space. As a result, the user 12 can experience a virtual reality as if the user 12 is in the room of the display world. Note that although the virtual world based on computer graphics is displayed in the illustrated example, a captured image of the real world, such as a panoramic photo, may be displayed, or the real world and the virtual world may be combined.

To provide a sense of realism in the display, it is desirable to reflect, as accurately as possible, the physical phenomenon occurred in the space to be displayed. For example, the propagation of various types of light reaching the eyes, such as diffuse reflection and specular reflection on the surface of the object and ambient light, can be accurately calculated to more realistically express the change in the tone and the luminance of the surface of the object caused by the movement of the point of view. Ray tracing is a representative method for realizing this. However, such highly accurate physical calculation may cause latency of display that cannot be ignored, particularly in an environment that permits a free point of view.

Therefore, in the present embodiment, an image as viewed from a specific point of view is acquired in advance and used to determine a pixel value of the display image with respect to any point of view. That is, the color of the object displayed as an image in the display image is determined by extracting the color from the corresponding section of the image acquired in advance. Hereinafter, the point of view set in the preliminary image acquisition will be referred to as a "reference point of view," and the image acquired in advance as viewed from the reference point of view will be referred to as a "reference image" or an "image of reference point of view." Part of data used to draw the display image can be acquired in advance as a reference image to reduce the latency of display after the movement of the point of view. In addition, there are basically no time constraints in the generation stage of the reference image, and a lot of time can be spent for highly accurate physical calculation such as ray tracing.

A plurality of reference points of view can be dispersed and set in an estimated range of movement of the point of view at the time of the display, and the reference image can be prepared for each. In this way, the tones of the same object viewed from a plurality of points of view can be taken into account to more highly accurately express the object according to the point of view at the time of the display. More specifically, when the point of view at the time of the display matches one of the reference points of view, the pixel values of the reference image corresponding to the reference point of view can be adopted as it is. When the point of view at the time of the display is between a plurality of reference points of view, the pixel values of the reference images corresponding to the plurality of reference points of view can be combined to determine the pixel values of the display image.

Figure 4:
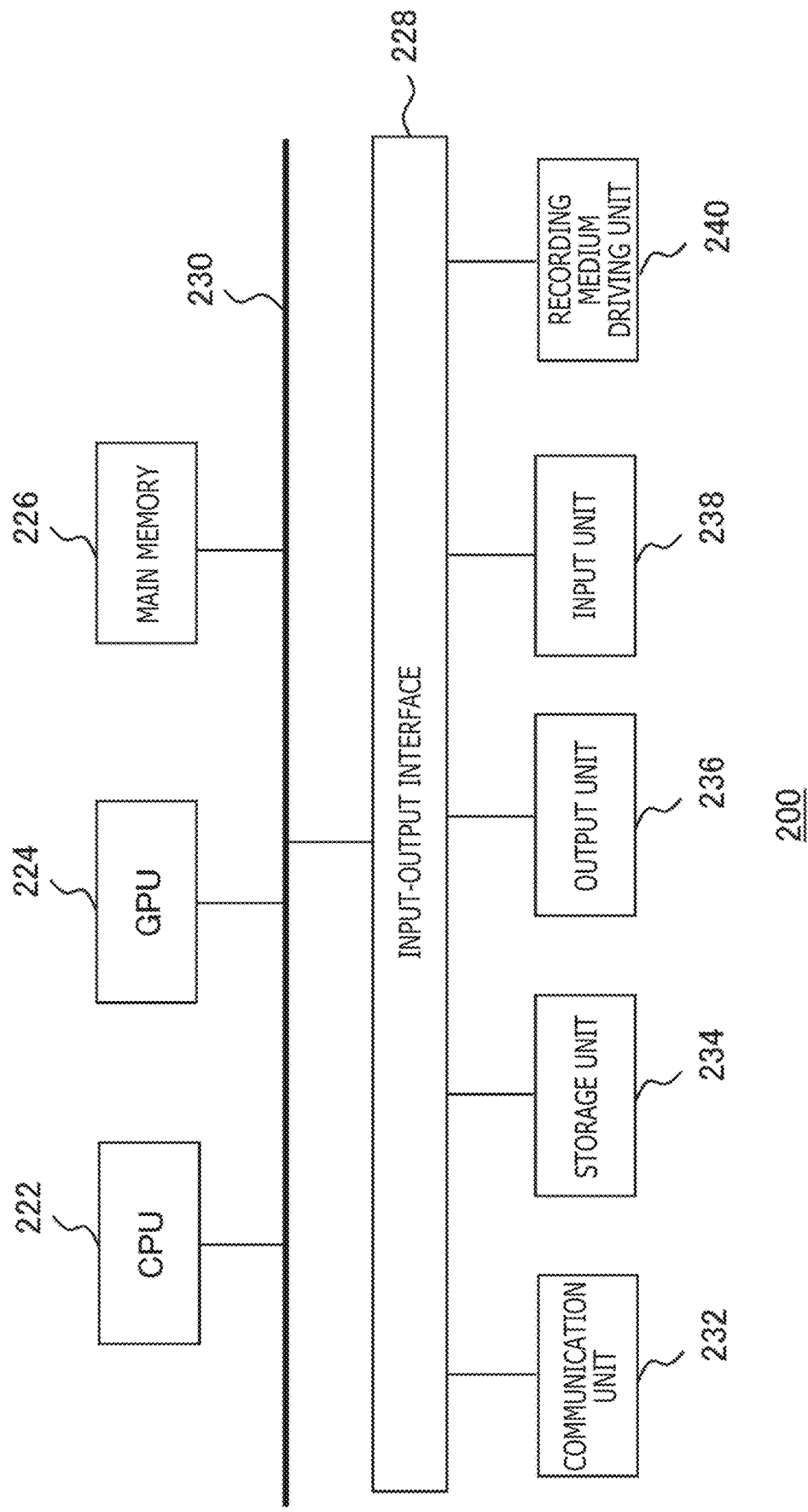
FIG. 4 is a diagram illustrating an internal circuit configuration of a display image generation apparatus of the present embodiment.

FIG. 4 illustrates an internal circuit configuration of the display image generation apparatus 200. The display image generation apparatus 200 includes a CPU (Central Processing Unit) 222, a GPU (Graphics Processing Unit) 224, and a main memory 226. The components are connected to each other through a bus 230. An input-output interface 228 is further connected to the bus 230.

The input-output interface 228 includes a communication 232 including a peripheral device interface of USB, IEEE (Institute of Electrical and Electronic Engineers) 1394, or the like or a network interface of wired or wireless LAN (Local Area Network), a storage unit 234, such as a hard disk drive and a non-volatile memory, an output unit 236 that outputs data to a display apparatus such as the head-mounted display 100, an input unit 238 that receives data from the head-mounted display 100, and a recording medium driving unit 240 that drives a removable recording medium, such as a magnetic disk, an optical disk, and a semiconductor memory.

The CPU 222 executes an operating system stored in the storage unit 234 to control the entire image generation apparatus 200. The CPU 222 also executes various programs read from the removable recording medium and loaded to the main memory 226 or various programs downloaded through the communication unit 232. The GPU 224 has a function of a geometry engine and a function of a rendering processor. The GPU 224 executes a drawing process according to a drawing command from the CPU 222 and stores the display image in a frame buffer not illustrated. In addition, the GPU 224 converts the display image stored in the frame buffer into a video signal and outputs the video signal to the output unit 236. The main memory 226 includes a RAM (Random Access Memory) and stores programs and data necessary for processing.

Figure 5:
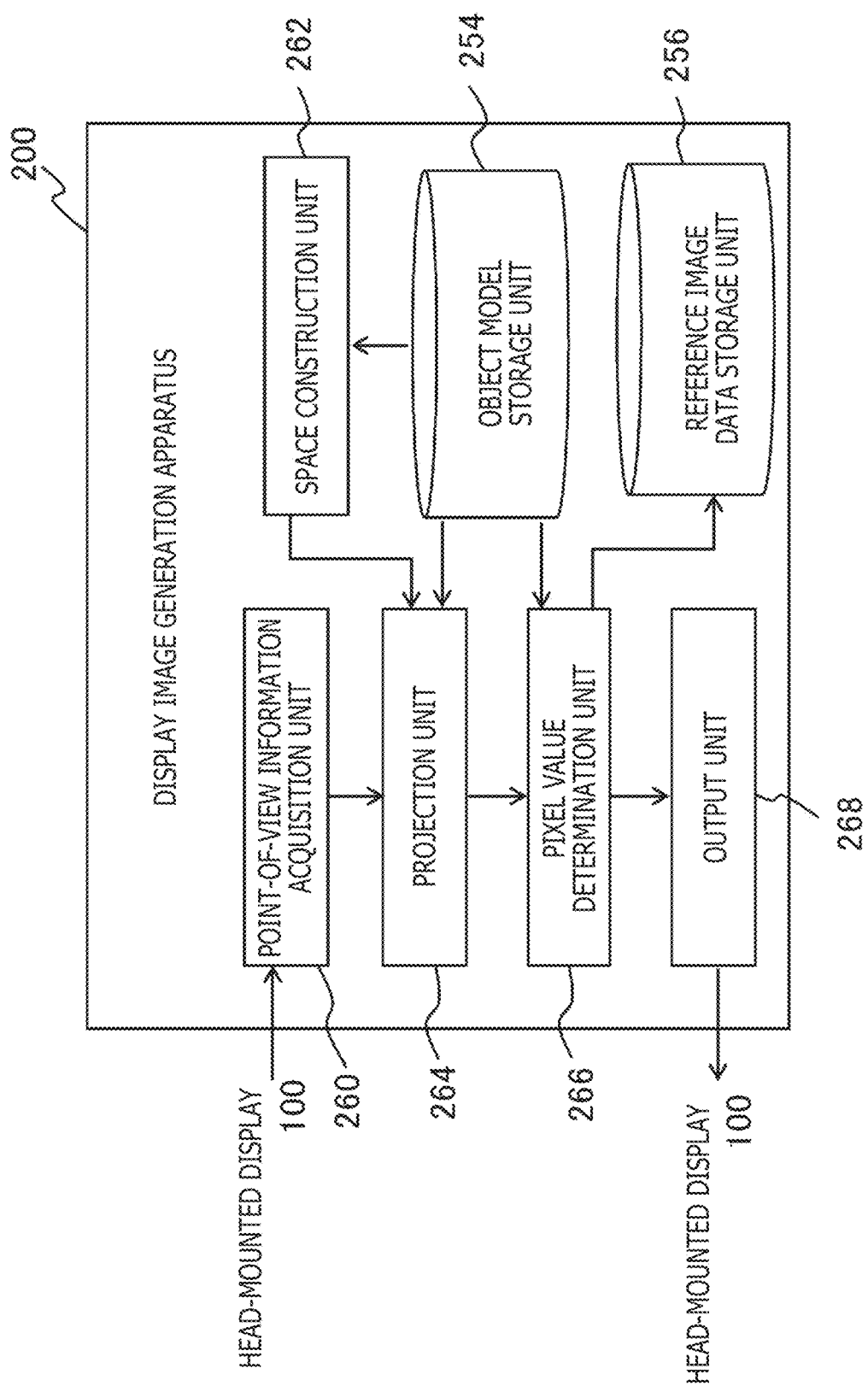
FIG. 5 is a diagram illustrating functional blocks of the display image generation apparatus according to the present embodiment.

FIG. 5 illustrates a configuration of functional blocks of the display image generation apparatus 200 according to the present embodiment. Although the display image generation apparatus 200 may execute general information processing, such as advancing an electronic game or communicating with a server, as described above, a function of generating data of the display image according to the point of view is particularly focused and illustrated in FIG. 5. Note that at least part of the functions of the display image generation apparatus 200 illustrated in FIG. 5 may be included in the head-mounted display 100. Alternatively, at least part of the functions of the display image generation apparatus 200 may be included in the server connected to the display image generation apparatus 200 through the network.

In addition, the functional blocks illustrated in FIG. 5 and FIG. 6 described later can be realized by components, such as the CPU, the GPU, and various memories illustrated in FIG. 4, in terms of hardware. The functional blocks are realized by programs that are loaded from the recording medium or the like to the memory and that perform various functions, such as a data input function, a data holding function, an image processing function, and a communication function, in terms of software. Therefore, those skilled in the art would understand that the functional blocks can be realized in various forms only by hardware, only by software, or by combinations of hardware and software, and the functional blocks are not limited to only one of the hardware and the software.

The display image generation apparatus 200 includes a point-of-view information acquisition unit 260 that acquires information regarding the point of view of the user, a space construction unit 262 that constructs a space including objects to be displayed, a projection unit 264 that projects the objects to a view screen, a pixel value determination unit 266 that determines values of pixels included in an image of the object to complete a display image, and an output unit 268 that outputs data of the display image to the head-mounted display 100. The display image generation apparatus 200 further includes an object model storage unit 254 that stores data regarding an object model necessary for constructing the space, and a reference image data storage unit 256 that stores data relating with a reference image.

The point-of-view information acquisition unit 260 includes the input unit 238, the CPU 222, and the like of FIG. 4 and acquires the position of the point of view and the direction of the line of sight of the user at a predetermined rate. For example, the point-of-view information acquisition unit 260 successively acquires output values of an acceleration sensor built in the head-mounted display 100 to thereby acquire the posture of the head. Furthermore, luminescent markers not illustrated are provided outside of the head-mounted display 100, and the point-of-view information acquisition unit 260 acquires a captured image of the luminescent markers from an imaging apparatus not illustrated to thereby acquire the position of the head in the real space.

Alternatively, an imaging apparatus not illustrated that captures an image corresponding to the field of view of the user may be provided on the head-mounted display 100 side, and a technique, such as SLAM (Simultaneous Localization and Mapping), may be used to acquire the position and the posture of the head. If the position and the posture of the head can be acquired in this way, the position of the point of view and the direction of the line of sight of the user can be substantially specified. Those skilled in the art would understand that the method of acquiring the information regarding the point of view of the user is not limited to a case of using the head-mounted display 100, and there can be various methods.

The space construction unit 262 includes the CPU 222, the GPU 224, the main memory 226, and the like of FIG. 4 and constructs a shape model of the space including the objects to be displayed. In the example illustrated in FIG. 3, the objects including the walls, the floor, the window, the table, the things on the table, and the like representing the inside of the room are arranged in the world coordinate system defining the virtual space. The information regarding the shapes of individual objects is read from the object model storage unit 254. The space constructed by the space construction unit 262 may be fixed or may be changed according to the progress of a game or the like. Here, it is only necessary that the space construction unit 262 determine the shapes, the positions, and the postures of the objects, and a modeling method based on a surface model in general computer graphics can be used.

It is to be noted that, in the present embodiment, it is made possible to represent a state of an object moving or being deformed in a virtual space. To this end, data for defining movements and deformations of the object are also stored into the object model storage unit 254 in advance. For example, time series data representing positions and shapes of the object at predetermined intervals of time are stored in advance. Alternatively, a program for causing such changes is stored in advance. The space construction unit 262 reads out the data and changes the object placed in the virtual space.

The projection unit 264 includes the GPU 224, the main memory 226, and the like of FIG. 4 and sets the view screen according to the information of the point of view acquired by the point-of-view information acquisition unit 260. That is, the projection unit 264 sets the screen coordinates according to the position of the head and the direction of the face to thereby draw, on the screen plane, the space to be displayed based on the field of view corresponding to the position of the user and the direction of the user facing.

The projection unit 264 further projects, to the view screen, the objects in the space constructed by the space construction unit 262 at a predetermined rate. A method of general computer graphics for perspective transformation of a mesh of polygons or the like can also be used for the process. The pixel value determination unit 266 includes the GPU 224, the main memory 226, and the like of FIG. 4 and determines the values of the pixels included in the images of the objects to be projected to the view screen. In this case, the pixel value determination unit 266 reads the data of the reference images from the reference image data storage unit 256 as described above and extracts and uses the values of the pixels representing the points on the same object.

For example, the pixel value determination unit 266 specifies the corresponding pixels from the reference images generated for the reference points of view around the actual point of view and weights and averages the pixels based on the distances and the angles between the actual point of view and the reference points of view to thereby set the pixel values of the display image. The ray tracing or the like can be used to accurately generate the reference images by spending a lot of time, and in the operation, the light-load calculation of reading the corresponding pixel values to obtain the weighted average can be performed. This can realize high-definition image expression close to a case of performing the ray tracing.

In a case where a movement or a deformation of an object is represented, the reference image naturally becomes a moving image when a state of the object is viewed from the reference point of view. Accordingly, the pixel value determination unit 266 refers to a frame of the reference image at time corresponding to a moving image of the object projected by the projection unit 264. That is, the pixel value determination unit 266 establishes synchronism with the movement of the object in the virtual space generated by the space construction unit 262 and then refers to the moving image of the reference image.

Note that the reference image is not limited to the graphics image drawn by ray tracing, and the reference image may be, for example, an image of the real space captured in advance from the reference point of view. In this case, the space construction unit 262 constructs a shape model of the imaged real space, and the projection unit 264 projects the shape model to the view screen corresponding to the point of view at the time of the display. Alternatively, the process of the space construction unit 262 and the projection unit 264 may not be executed as long as the positions of the images of the objects to be imaged can be determined in the field of view corresponding to the point of view at the time of the display.

In a case of stereoscopically displaying the display image, the projection unit 264 and the pixel value determination unit 266 performs the process to each of the points of view of the left eye and the right eye. The output unit 268 includes the CPU 222, the main memory 226, the output unit 236, and the like of FIG. 4 and transmits the data of the display image, which is completed by the pixel value determination unit 266 by determining the pixels values, to the head-mounted display 100 at a predetermined rate. In a case where the stereo images for stereoscopic display are generated, the output unit 268 generates an image by connecting the stereo images on the left and right and outputs the image as the display image. In a case of the head-mounted display 100 for viewing the display image through a lens, the output unit 268 may take into account the distortion caused by the lens to correct the display image.

Figure 6:
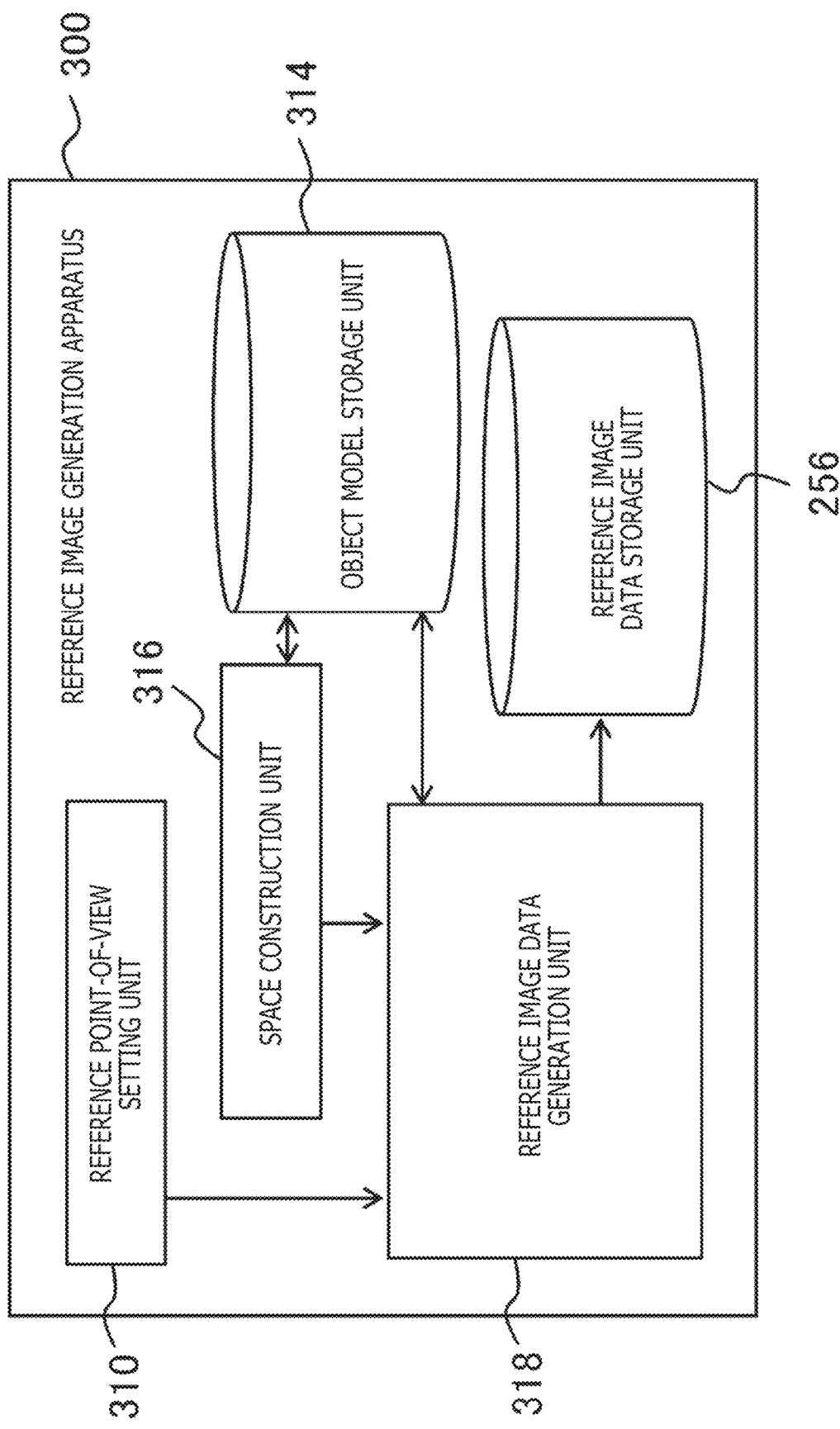
FIG. 6 is a diagram illustrating functional blocks of a reference image generation apparatus according to the present embodiment.

FIG. 6 illustrates functional blocks of an apparatus that generates data of the reference image. A reference image generation apparatus 300 may be part of the display image generation apparatus 200 of FIG. 5 or may be independently provided as an apparatus that generates data to be used for display. In addition, electronic content including the data of the generated reference image, the object model used for the generation, and data defining the movements may be stored in a recording medium or the like, and the electronic content may be loaded to the main memory in the display image generation apparatus 200 at the operation. The internal circuit configuration of the reference image generation apparatus 300 may be similar to the internal circuit configuration of the display image generation apparatus 200 illustrated in FIG. 4.

The reference image generation apparatus 300 includes a reference point-of-view setting unit 310 that sets a reference point of view, a space construction unit 316 that constructs a space including objects to be displayed, a reference image data generation unit 318 that generates data of the reference image for each reference point of view based on the constructed space, an object model storage unit 314 that stores data regarding the object model necessary for constructing the space, and a reference image data storage unit 256 that stores the data of the generated reference image.

The reference point-of-view setting unit 310 includes the input unit 238, the CPU 222, the main memory 226, and the like and sets the position coordinates of the reference point of view in the space to be displayed. Preferably, the reference point-of-view setting unit 310 distributes a plurality of reference points of view to cover the possible range of the point of view of the user. Appropriate values of the range and the number of reference points of view vary depending on the configuration of the space to be displayed, the purpose of the display, the accuracy required for the display, the processing performance of the display image generation apparatus 200, and the like. Therefore, the reference point-of-view setting unit 310 may receive an input of the user regarding the position coordinates of the reference point of view. Therefore, the reference point-of-view setting unit 310 may accept a setting input of position coordinates of the reference point of view from a creator of the display content. Alternatively, the reference point-of-view setting unit 310 may change the position of the reference point of view in response to the movement of the object as hereinafter described.

The space construction unit 316 includes the CPU 222, the GPU 224, the main memory 226, and the like and constructs a shape model of the space including the object to be displayed. The function corresponds to the function of the space construction unit 262 illustrated in FIG. 5. On the other hand, to accurately draw the image of the object using the ray tracing or the like, the reference image generation apparatus 300 of FIG. 6 uses a modeling method based on a solid model in which the color and the material of the object are taken into account. Therefore, model data of the object including information of the color, the material, and the like is stored in the object model storage unit 314.

Furthermore, the space construction unit 316 moves or deforms the object in the virtual space. Alternatively, the space construction unit 316 may change the state of illumination or change the color of the object. Information for defining such a chance as just described may be read out from the object model storage unit 314 in which it is stored in advance or may be set by direct inputting by the creator of the display content. In the latter case, the space construction unit 316 changes the object in accordance with the input information and stores information defining the change into the object model storage unit 314 such that a same change occurs at the time of the display.

The reference image data generation unit 318 includes the CPU 222, the GPU 224, the main memory 226, and the like, and for each reference point of view set by the reference point-of-view setting unit 310, draws the object to be displayed that can be viewed from the reference point of view at a predetermined rated. Preferably, the reference image can be prepared as a panoramic moving image covering all directions from the reference point-of-view, and the point of view can be freely changed in all directions at the time of the display. Furthermore, it is desirable to spend a lot of time to calculate the propagation of light beam to thereby accurately indicate the appearance at each reference point of view in the reference image.

The reference image data generation unit 318 also generates a depth image corresponding to each reference image generated by the reference image generation unit 322. That is, the reference image data generation unit 318 obtains the distance (depth value) from the screen plane to the object indicated by each pixel of the reference image, and generate the depth image depicted as a pixel value. Note that in a case where the reference image is a panoramic image in all directions, the view screen has a spherical surface, and the depth value is the distance from the spherical surface to the object in the normal direction. The generated depth image is used to select the reference image to be referred to for determining the pixel values of the display image.

Alternatively, the reference image data generation unit 318 may generate different information to be used when a reference image of a referring destination is selected at the time of display in place of a depth image as hereinafter described. In particular, reference image data generation unit 318 determines, for a position of the object surface, a reference image to be referred to when the position is drawn in advance. In this case, the reference image data generation unit 318 stores the information as additional information of the object model into the object model storage unit 314. Note that it is sufficient if at least data to be used for generation of a display image from among data to be stored into the object model storage unit 314 of FIG. 6 are stored into the object model storage unit 254 of FIG. 5.

The reference image data generation unit 318 stores the generated data in an associated relation with the position coordinates of the reference point of view into the reference image data storage unit 256. Although basically a reference image and a depth image in pair are stored for one reference point of view into the reference image data storage unit 256, in a mode in which a depth image is not used at the display of the display as described hereinabove, only a reference image is stored for one reference point of view. Also, a reference image and a depth image in pair are hereinafter referred to sometimes as "data of a reference image."

In the present embodiment, since the reference image and the depth image are videos, the data size of the reference image is likely to increase depending upon the number of reference points of view. Therefore, the reference image data generation unit 318 decreases the data size and the load of processing at the time of generation of a display image by using such a data structure that an image is updated only in regard to a region indicating some movement in a generated video. Furthermore, the reference image data generation unit 318 generates an integrated moving image in which a frame of a reference image and a frame of a depth image at the same time are represented in one frame and performs compression encoding in a unit of the integrated moving image to compress the data size and reduce the load of a decoding decompression process and a synchronization process at the time of the display. Details are hereinafter described.

Figure 7:
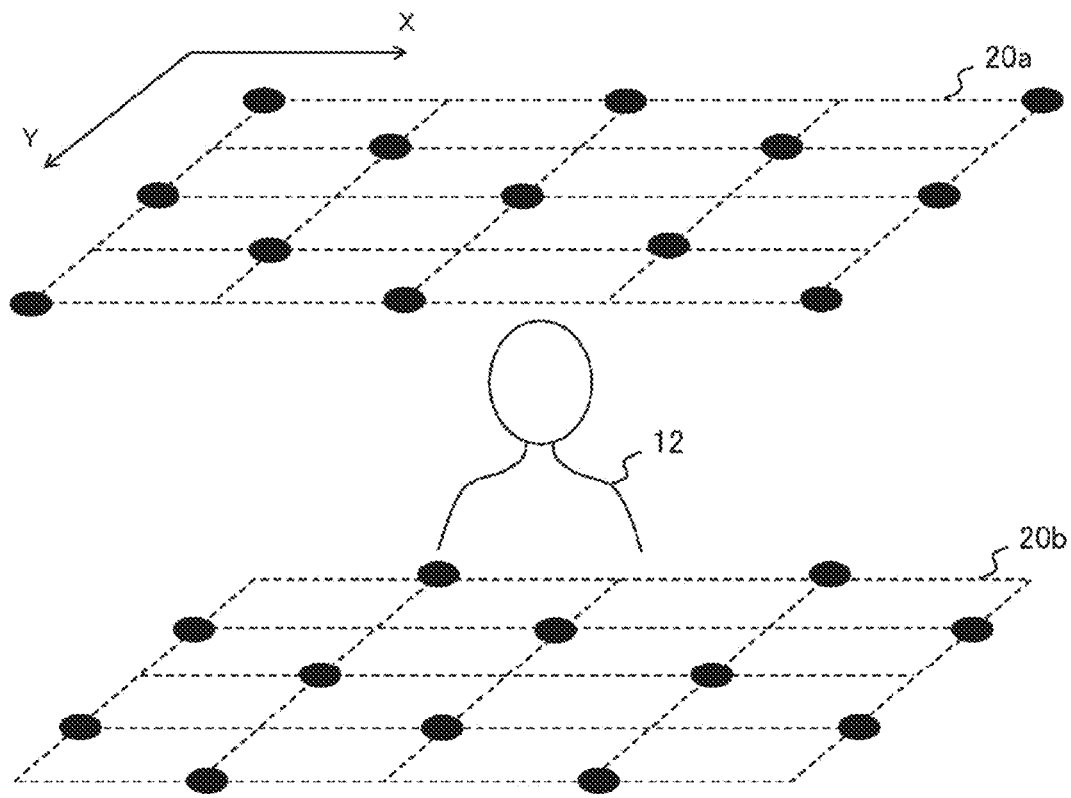
FIG. 7 is a diagram illustrating an example of setting a reference point of view according to the present embodiment.

FIG. 7 illustrates an example of setting the reference points of view. In the example, a plurality of reference points of view are set on a horizontal plane 20a at the level of the eyes of the user 12 standing and on a horizontal plane 20b at the level of the eyes of the user 12 sitting, as indicated by black circles. For example, the horizontal plane 20a is at 1.4 m from the floor, and the horizontal plane 20b is at 1.0 m from the floor. In addition, a movement range according to the content of display is estimated in the left and right direction (X-axis direction in FIG. 7) and in the front and back direction (Y-axis direction in FIG. 7) around a standard position (home position) of the user, and the reference points of view are distributed to corresponding rectangular regions on the horizontal planes 20a and 20b.

In the example, the reference points of view are alternately arranged at intersections of a grid dividing the rectangular regions into four equal parts in the X-axis direction and the Y-axis direction. In addition, the reference points of view are shifted and arranged so that the reference points of view do not overlap in the upper and lower horizontal planes 20a and 20b. As a result, a total of twenty five reference points of view including thirteen points on the upper horizontal plane 20a and twelve points on the lower horizontal plane 20b are set in the example illustrated in FIG. 7.

However, it is not intended to limit the distribution of the reference points of view to this. The reference points of view may be distributed on a plurality of planes including a vertical plane or the like or may be distributed on a curved surface such as a spherical surface. In addition, the distribution may not be uniform, and the reference points of view may be distributed at a higher density in a range where the user is likely to exist. Furthermore, as described above, the reference points of view are arranged to correspond to the object to be displayed, and may be also moved in response to the movement of the object. In this case, the reference image includes data of moving images reflecting the movement of each reference point of view.

Alternatively, a display image may be generated by setting, for each object, a reference point of view so as to surround the object and preparing a reference image representing only each object such that, at the time of display, an image is generated for each object and the images are combined. By this, the positional relation between the object and the reference point of view can be controlled independently. As a result, for example, an important object or an object having high possibility that it may be viewed closely can be represented more in detail, or even if individual objects move differently from one another, the levels of detail of all objects can be represented uniformly. Meanwhile, in regard to an object that is stationary such as the back ground, by representing the reference image as a still picture from a fixed reference point of view, increase of the data size can be suppressed.

Figure 8:
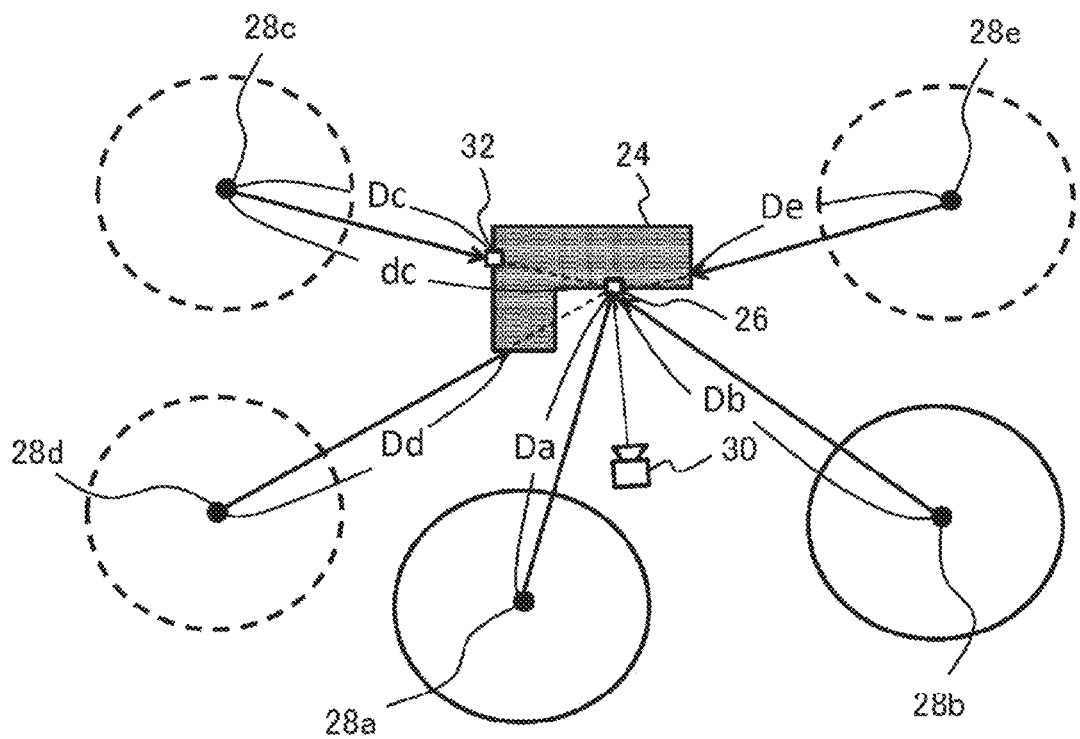
FIG. 8 is a diagram for describing a method of selecting a reference image to be used to determine a pixel value of a display image executed by a pixel value determination unit according to the present embodiment.

FIG. 8 is a diagram for describing a method of selecting the reference image to be used to determine the pixel values of the display image executed by the pixel value determination unit 266 of the display image generation apparatus 200. FIG. 8 illustrates a state of overlooking the space to be displayed including an object 24. It is assumed that five reference points of view 28a to 28e are set in the space, and the data of the reference image is generated for each. Circles around the reference points of view 28a to 28e in FIG. 8 schematically illustrate screen surfaces of the reference images prepared as an omnidirectional panoramic image.

Assuming that the point of view of the user at the time of the image display is at the position of a virtual camera 30, the projection unit 264 determines the view screen to correspond to the virtual camera 30 and projects the model shape of the object 24. As a result, the correspondence between the pixel in the display image and the position on the surface of the object 24 is found out. Furthermore, in a case of, for example, determining the value of the pixel representing an image of a point 26 on the surface of the object 24, the pixel value determination unit 266 first specifies the reference image displaying the image of the point 26.

The position coordinates of the reference points of view 28a to 28e and the point 26 in the world coordinate system are known, and the distances can be easily obtained. In FIG. 8, the distance is indicated by the length of a line segment connecting each of the reference points of view 28a to 28e and the point 26. In addition, the point 26 can also be projected to the screen plane of each reference point of view to specify the position of the pixel where the image of the point 26 is to be displayed in each reference image. On the other hand, depending on the position of the reference point of view, the point 26 may be on the back side of the object or may be hidden by an object in front, and the image may not be displayed at the position in the reference image.

Therefore, the pixel value determination unit 266 checks the depth image corresponding to each reference image. The pixel value of the depth image represents the distance from the screen surface to the object displayed as an image in the corresponding reference image. Therefore, the distance from the reference point of view to the point 26 and the depth value of the pixel in the depth image where the image of the point 26 is to be displayed can be compared to determine whether or not the image is an image of the point 26.

For example, a point 32 on the back side of the object 24 exists on the line of sight from the reference point of view 28c to the point 26, and the pixel where the image of the point 26 in the corresponding reference image is to be displayed actually represents the image of the point 32. Therefore, the value indicated by the pixel of the corresponding depth image is the distance to the point 32, and a distance Dc obtained by converting the value into a value with the start point at the reference point of view 28c is clearly smaller than a distance dc to the point 26 calculated from the coordinate value. Therefore, when the difference between the distance Dc obtained from the depth image and the distance dc to the point 26 obtained from the coordinate value is equal to or greater than a threshold, the reference image is removed from the calculation of the pixel value representing the point 26.

Similarly, the differences between distances Dd and De from the corresponding pixels obtained from the depth images of the reference points of view 28d and 28e to the object and distances from the reference points of view 28d and 28e to the point 26 are equal to or greater than the threshold, and the reference images are removed from the calculation. On the other hand, it can be specified by the threshold determination that distances Da and Db from the corresponding pixels obtained from the depth images of the reference points of view 28a and 28b to the object are substantially the same as distances from the reference points of view 28a and 28b to the point 26. The pixel value determination unit 266 uses the depth values in this way to perform screening to thereby select, for each pixel of the display image, the reference image to be used to calculate the pixel value.

Although FIG. 8 illustrates five reference points of view, the comparison using the depth value is actually applied to all of the reference points of view distributed as illustrated in FIG. 7. As a result, a more accurate display image can be drawn. On the other hand, referring to approximately twenty five depth images and reference images for all pixels of the display image may produce a load that cannot be ignored depending on the processing performance of the apparatus. Therefore, prior to the selection of the reference image to be used for determining the pixel value as described above, the reference images as candidates for the selection may be narrowed down by a predetermined standard. For example, the reference points of view within a predetermined range from the virtual camera 30 are extracted, and the selection process using the depth values is applied to only the reference images from the reference points of view.

In this case, the upper limit of the number of reference points of view to be extracted may be set to ten, twenty, or the like, and the range of extraction may be adjusted so that the number of reference points of view falls within the upper limit. The reference points of view may be chosen randomly or based on a predetermined rule. In addition, the number of reference points of view to be extracted may vary depending on the region on the display image. For example, in a case of using the head-mounted display to realize the virtual reality, the center region of the display image matches the direction of the line of sight of the user, and it is desirable to draw the center region with accuracy higher than the accuracy of the peripheral region.

Therefore, a larger number of reference points of view (reference images) are set as selection candidates for a pixel in a predetermined range from the center of the display image, and on the other hand, the number of selection candidates is reduced for a pixel outside of the range. For example, approximately twenty reference images can be set as selection candidates in the center region, and approximately ten reference images can be set as selection candidates in the peripheral region. However, the number of regions is not limited to two, and the number of regions may be three or more. Furthermore, there can be not only the sorting dependent on the distance from the center of the display image, but also dynamic sorting performed according to the region of the image of the target object or the like.

In this way, the number of reference images to be referenced can be controlled based on a factor other than whether or not the image of the object is displayed, and the display image can be drawn under optimal conditions in which the processing performance of the apparatus, the accuracy required for the display, the content of the display, and the like are taken into account.

Figure 9:
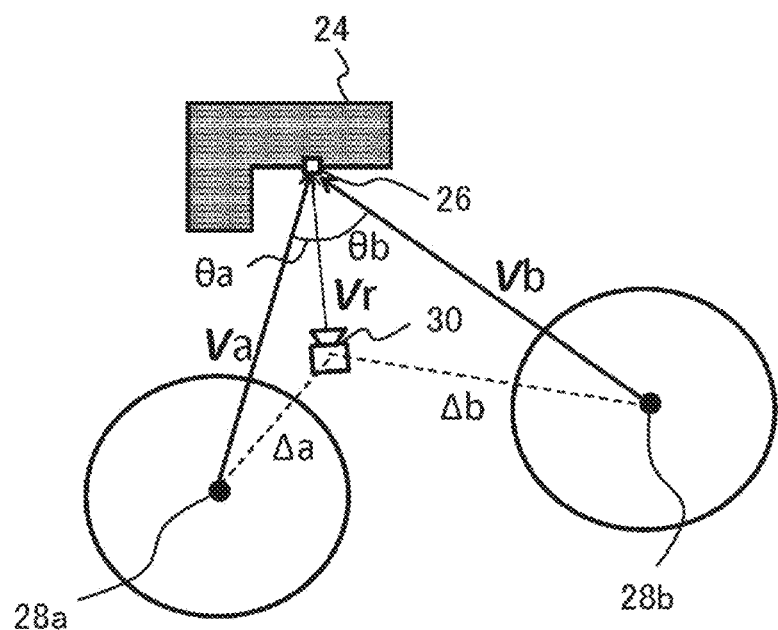
FIG. 9 is a diagram for describing a method of determining the pixel value of the display image executed by the pixel value determination unit according to the present embodiment.

FIG. 9 is a diagram for describing a method of determining the pixel value of the display image executed by the pixel value determination unit 266. As illustrated in FIG. 8, it is found out that the image of the point 26 of the object 24 is displayed in the reference images of the reference points of view 28a and 28b. The pixel value determination unit 266 basically blends the pixel values of the image of the point 26 in the reference images to determine the pixel value of the image of the point 26 in the display image corresponding to the actual point of view.

Here, a pixel value C in the display image is calculated as follows, where $c_1$ and $c_2$ represent the pixel values (color values) in the reference images of the reference points of view 28a and 28b, respectively, regarding the image of the point 26.

$$C = w_1 \cdot c_1 + w_2 \cdot c_2$$

Here, coefficients $w_1$ and $w_2$ represent weights in a relation of $w_1 + w_2 = 1$, that is, contribution ratios of the reference images, and the coefficients $w_1$ and $w_2$ are determined based on the positional relation between the reference points of view 28a and 28b and the virtual camera 30 representing the actual point of view. For example, the closer the distance from the virtual camera 30 to the reference point of view, the larger the coefficient provided. In this way, the contribution ratio is increased.

In this case, the weighting coefficients can have the following functions, where $\Delta a$ and $\Delta b$ represent the distances from the virtual camera 30 to the reference points of view 28a and 28b, and sum = $1/\Delta a^2 + 1/\Delta b^2$ is set.

$$w_1 = (1/\Delta a^2)/\text{sum}$$

$$w_2 = (1/\Delta b^2)/\text{sum}$$

The equations are generalized as follows, where N represents the number of reference images used, i ($1 \leq i \leq N$) represents the identification number of the reference point of view, $\Delta i$ represents the distance from the virtual camera 30 to the ith reference point of view, $c_i$ represents the corresponding pixel value in each reference image, and $w_i$ represents the weight coefficient.

[Math. 1]

$$C = \sum_{i=1}^{N} w_i \cdot c_i \qquad \text{(Equation 1)}$$

$$w_i = \frac{1}{\Delta i^2} \cdot \frac{1}{\text{sum}}, \text{sum} = \sum_{i=1}^{N} \frac{1}{\Delta i^2}$$

Note that in a case where $\Delta i$ is 0 in the equations, that is, in a case where the virtual camera 30 matches one of the reference points of view, the weighting coefficient for the pixel value of the corresponding reference image is set to 1, and the weighting coefficients for the pixel values of the other reference images are set to 0. In this way, the reference image accurately created for the point of view can be reflected as it is on the display image. However, it is not intended to limit the formulas to these.

In addition, the parameter used to calculate the weighting coefficient is not limited to the distance from the virtual camera to the reference point of view. For example, the parameters may be based on angles θa and θb (0≤θa, θb≤90° formed by gaze vectors Va and Vb from the reference points of view to the point 26 with respect to a gaze vector Vr from the virtual camera 30 to the point 26. For example, inner products (Va·Vr) and (Vb·Vr) of the vectors Va and Vb and the vector Vr can be used to calculate the weighting coefficients as follows.

$$w_1 = (Va \cdot Vr)/((Va \cdot Vr) + (Vb \cdot Vr))$$

$$w_2 = (Vb \cdot Vr)/((Va \cdot Vr) + (Vb \cdot Vr))$$

The equations are generalized as follows as described above, where N represents the number of reference images used, $V_i$ represents the gaze vector from the reference point of view i to the point 26, and $w_i$ represents the weighting coefficient.

[Math. 2]

$$w_i = \frac{(V_i \cdot Vr)}{\sum_{i=1}^{N} (V_i \cdot Vr)} \qquad \text{(Equation 2)}$$

In any case, the specific formula is not particularly limited as long as a calculation rule is implemented such that the closer the state of the reference point of view to the virtual camera 30 with respect to the point 26, the larger the weighting coefficient. The "closeness of state" may be evaluated from diversified viewpoints based on both of the distance and the angle to determine the weighting coefficient. Furthermore, the shape of the surface of the object 24 at the point 26 may also be taken into account. The luminance of the reflected light from the object generally has angular dependence based on the inclination (normal line) of the surface. Therefore, the angle formed by the normal vector at the point 26 and the gaze vector Vr from the virtual camera 30 and the angles formed by the normal vector and the gaze vectors Va and Vb from the reference points of view may be compared, and a larger weighting coefficient may be set for a smaller difference.

In addition, the function for calculating the weighting coefficient may be switched according to the attributes, such as material and color, of the object 24. For example, in a case of material in which specular reflection components are dominant, the material has strong directivity, and the observed color significantly varies depending on the angle of the gaze vector. On the other hand, in a case of material in which diffuse reflection components are dominant, the color does not significantly vary with respect to the angle of the gaze vector. Therefore, in the former case, a function may be used such that the closer the gaze vector of the reference point of view to the gaze vector Vr from the virtual camera 30 to the point 26, the larger the weighting coefficient. In the latter case, the weighting coefficients may be equal for all of the reference points of view, or a function may be used such that the angular dependence is smaller than in a case where the specular reflection components are dominant.

For the same reason, in a case of the material in which the diffuse reflection components are dominant, the reference images to be used to determine the pixel value C of the display image may be thinned out, or only the reference images with gaze vectors in which the closeness of angle to the actual gaze vector Vr is equal to or greater than a predetermined value may be used, thereby reducing the number of reference images to reduce the load of calculation. In this way, in a case of using different determination rules of the pixel value C according to the attributes of the object, data indicating the attributes, such as the material of the object indicated by each image of the reference images, is associated with each image of the reference images and stored in the reference image data storage unit 256.

According to the mode, the surface shape and the material of the object can be taken into account to more accurately reflect the directivity of specularly reflected light or the like on the display image. Note that two or more of the calculation based on the shape of the object, the calculation based on the attributes, the calculation based on the distance from the virtual camera to the reference point of view, and the calculation based on the angle formed by each gaze vector may be combined to determine the weighting coefficient.

Figure 10:
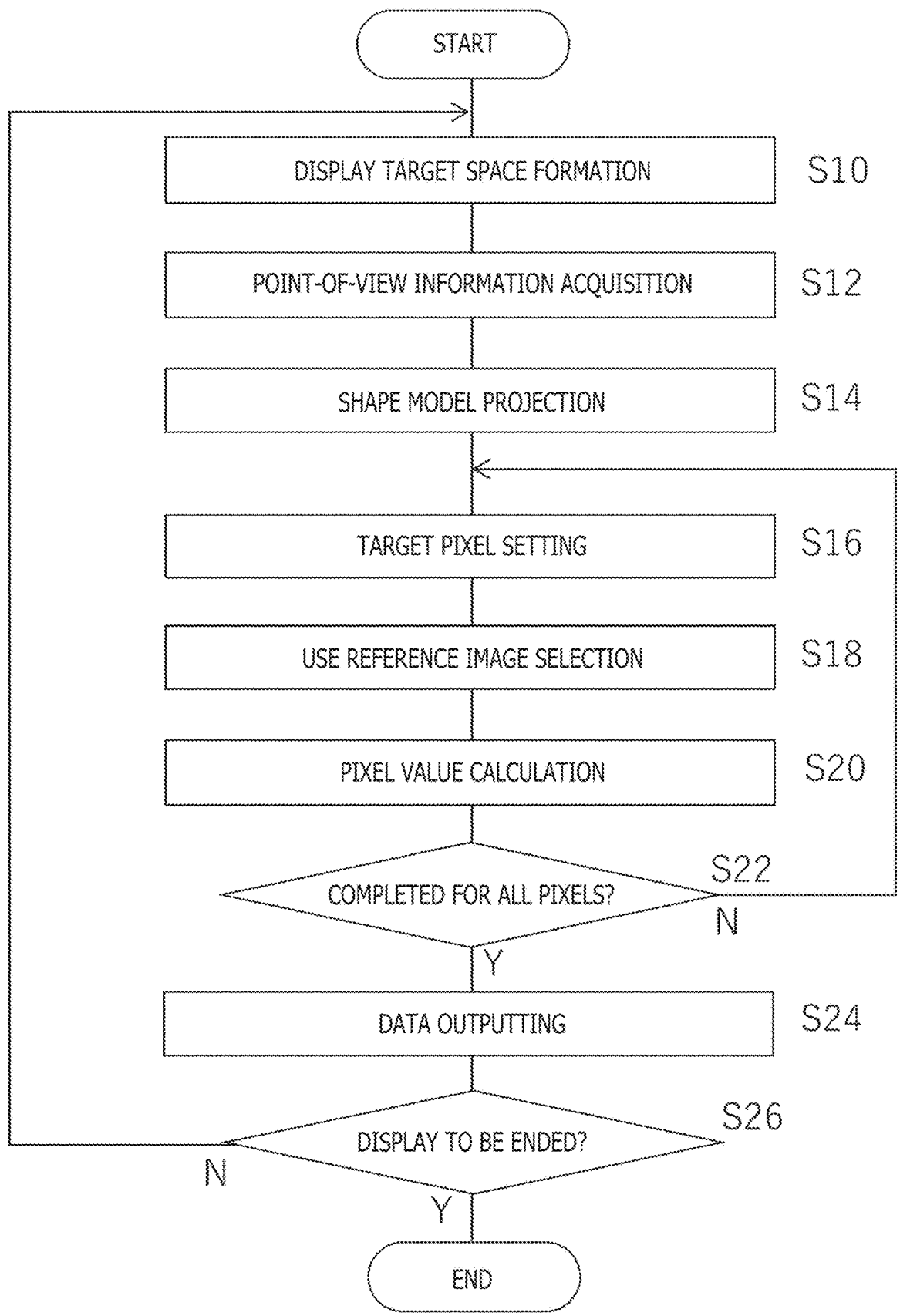
FIG. 10 is a flow chart illustrating a procedure of generating the display image according to a point of view executed by the display image generation apparatus according to the present embodiment.

Next, the operation of the image generation apparatus that can be realized by the configuration described above will be described. FIG. 10 is a flow chart illustrating a procedure of generating a display image according to the point of view executed by the display image generation apparatus 200. The flow chart is started in a state of accepting the movement of the point of view after an initial image is displayed by starting an application or the like started by a user operation. As described above, various types of information processing, such as an electronic game, may be executed in parallel with the illustrated display process. First, the space construction unit 262 forms an initial state of a three-dimensional space including the object to be displayed in the world coordinate system (S10).

On the other hand, the point-of-view information acquisition unit 260 specifies the position of the point of view and the direction of the line of sight at this point based on the position and the posture of the head of the user (S12). Next, the projection unit 264 sets a view screen with respect to the point of view and projects the object existing in the space to be displayed (S14). As described above, it is only necessary to take into account the surface shape in the process, such as by performing a perspective transformation of the vertices of the polygon mesh forming the three-dimensional model. Next, the pixel value determination unit 266 sets one target pixel among the pixels inside of the mesh projected in this way (S16) and selects the reference images to be used for determining the pixel value (S18).

That is, as described above, the pixel value determination unit 266 determines the reference images displaying the image of the point on the object indicated by the target pixel based on the depth images of the reference images. Furthermore, the pixel value determination unit 266 determines the weighting coefficients based on the reference points of view of the reference images, the positional relation with the virtual camera corresponding to the actual point of view, the shape and the material of the position, and the like and then obtains a weighted average or the like of the corresponding pixel values of the reference images to determine the value of the target pixel (S20). Note that those skilled in the art would understand that there can be various ways of statistical processing and interpolation processing other than the weighted average regarding the calculation of deriving the pixel value of the target pixel from the pixel values of the reference images.

The process of S18 and S20 is repeated for all of the pixels on the view screen (N in S22, S16). Once the pixel values of all of the pixels are determined (Y in S22), the output unit 268 outputs the data as data of the display image to the head-mounted display 100 (S24). Note that in a case of generating the display images for the left eye and for the right eye, the process of S16 to S22 is applied to each display image, and the display images are appropriately connected and output. If the display does not have to be finished (N in S26), then the space construction unit 262 forms a space of a display target for a next time step (S10). In particular, the space construction unit 262 moves the object by an amount corresponding to a time step from the initial state or deforms the object. Then, the space construction unit 262 acquires information of the point of view of the user at the point of time and sets a view screen and then performs generation and outputting of a display image (S12 to S24). The processes in step S10 to S24 are repeated till an end of the display process and, if it becomes necessary to end the display, ends all processes (Y in S26).

Note that although the reference images are used for all of the pixels on the view screen to determine the pixel value in the example of FIG. 10, the drawing method may be switched depending on the region on the display image or the position of the point of view. For example, only conventional texture mapping may be performed for the image of an object in which the light and the tone do not have to be changed after the movement of the point of view. In addition, a state observed only at a local point of view, such as reflected light with high directivity, is not entirely expressed from surrounding reference images in some cases. Therefore, the drawing can be switched to drawing by ray tracing only when the point of view is in the range, thereby reducing the amount of data prepared as the reference images.

FIG. 11 illustrates an example of a structure of data stored in the reference image data storage unit 256. Data 270 of reference images has a data structure in which, for each piece of identification information 272 of the reference images, position coordinates 274 of a reference point, a reference image 276 and a depth image 278 are associated with each other. The position coordinates 274 of the reference point of view are three-dimensional position coordinates in a virtual space set by the reference point-of-view setting unit 310 taking a movable range of the user 12 and so forth into consideration as described with reference to FIG. 7.

The reference image 276 is data of a video representative of a space including a moving object when viewed from each reference point of view. The depth image 278 is also data of a video representative of a distance of the space including the moving object from a screen surface. Although, in FIG. 11, reference images and depth images are represented by such character information as "video A," "video B," and "video C," and "depth video A," "depth video B," and "depth video C," respectively, actually they may each include information of a storage region in the reference image data storage unit 256 and so forth may be included.

FIG. 12 illustrates an example of setting of a reference point of view for representing an object that indicates a movement. The representing way of the illustration is similar to that of FIG. 8. In virtual spaces illustrated in (a) and (b) of FIG. 12, an object 34 and another object 35 exist. For them, the reference point-of-view setting unit 310 of the reference image generation apparatus 300 sets five reference points of view 30*a*, 30*b*, 30*c*, 30*d*, and 30*e*. Here, it is assumed that the object 35 moves as indicated by an arrow mark. In this regard, (a) of FIG. 12 illustrates a mode in which no reference point of view is moved.

In this case, a change of each reference image is limited principally to a region of a picture of the object 35. In particular, since no change occurs in a region of a wide range in each frame of the video of the reference image and the video of the depth image, the data size can be made smaller, for example, by applying a compression technique that utilizes the difference between frames. In the meantime, in the mode illustrated in (b) of FIG. 12, at least part of the reference points of view 30a to 30e are moved so as to correspond to the movement of the object 35 and are represented as reference points of view 36a to 36e. In the example illustrated, the four reference points of view 30a to 30d are moved to the reference points of view 36a to 36d by a velocity vector equal to the velocity vector of the object 35. However, the movement rule is not limited to this, and it is sufficient if the reference points of view are moved such that the distance to the object does not exceed a predetermined threshold value and besides the distance between the reference points of view does not become lower than a predetermined threshold value.

Since this relatively changes also the background and so forth other than the moving object 35, the region in which a change occurs between frames becomes greater and the data compression efficiency becomes lower. On the other hand, since the distance between the object and the reference points of view can be kept substantially fixed, the level of detail of a picture of the object in a display image is less likely to change. Taking these points into account, a setting rule of a reference point of view is selected suitably taking a level of detail demanded for a display image in order to represent an object, a range of movement of the object, a preferable data size and so forth into consideration.

Note that all reference points of view need not be moved by a same rule. For example, in a case where a plurality of objects 34 and 35 exist in a space of a display target and only one of the objects 34 and 35 moves as illustrated in FIG. 12, the reference point of view 30e (=36e) in the proximity of the object 34 that is in a stationary state may be fixed. Also, in a case in which the moving direction or the speed is different among a plurality of objects, the moving direction or the speed of the reference points of view may be set individually corresponding to them.

For example, for each object, reference points of view that take charge of the object are distributed in the predetermined range of the object, and the positions of the reference points of view are controlled such that the positional relation with the object is maintained. Here, "take charge of" indicates only tracking of the position, and the reference image may represent all objects that can be seen from the reference point of view. Alternatively, only pictures of an object that are taken charge of may be represented as reference images such that they are combined when pixel values of a display image are determined.

For example, after pixel values of a display image are determined temporarily using a reference image representing only the background, the display image is overwritten using another reference image that represents only an object that forms the foreground. Note that there may be a reference point of view that takes charge of a plurality of objects simultaneously. For example, a certain reference point of view may be moved by an average vector of moving speed vectors of a plurality of objects. It is to be noted that, in the mode of (b) of FIG. 12, data representing position coordinates of reference points of view change with respect to the time axis from among data of the reference images illustrated in FIG. 11.

Accordingly, the reference image generation apparatus 300 stores data of reference images and position coordinates of reference points of view in an associated relation with each other for each time step into the reference image data storage unit 256. The pixel value determination unit 266 of the display image generation apparatus 200 calculates weighting coefficients described hereinabove on the basis of the positional relation between the reference points of view and the point of view of the user in the same time step and then determines pixel values of the display image of the time step.

Figure 13:
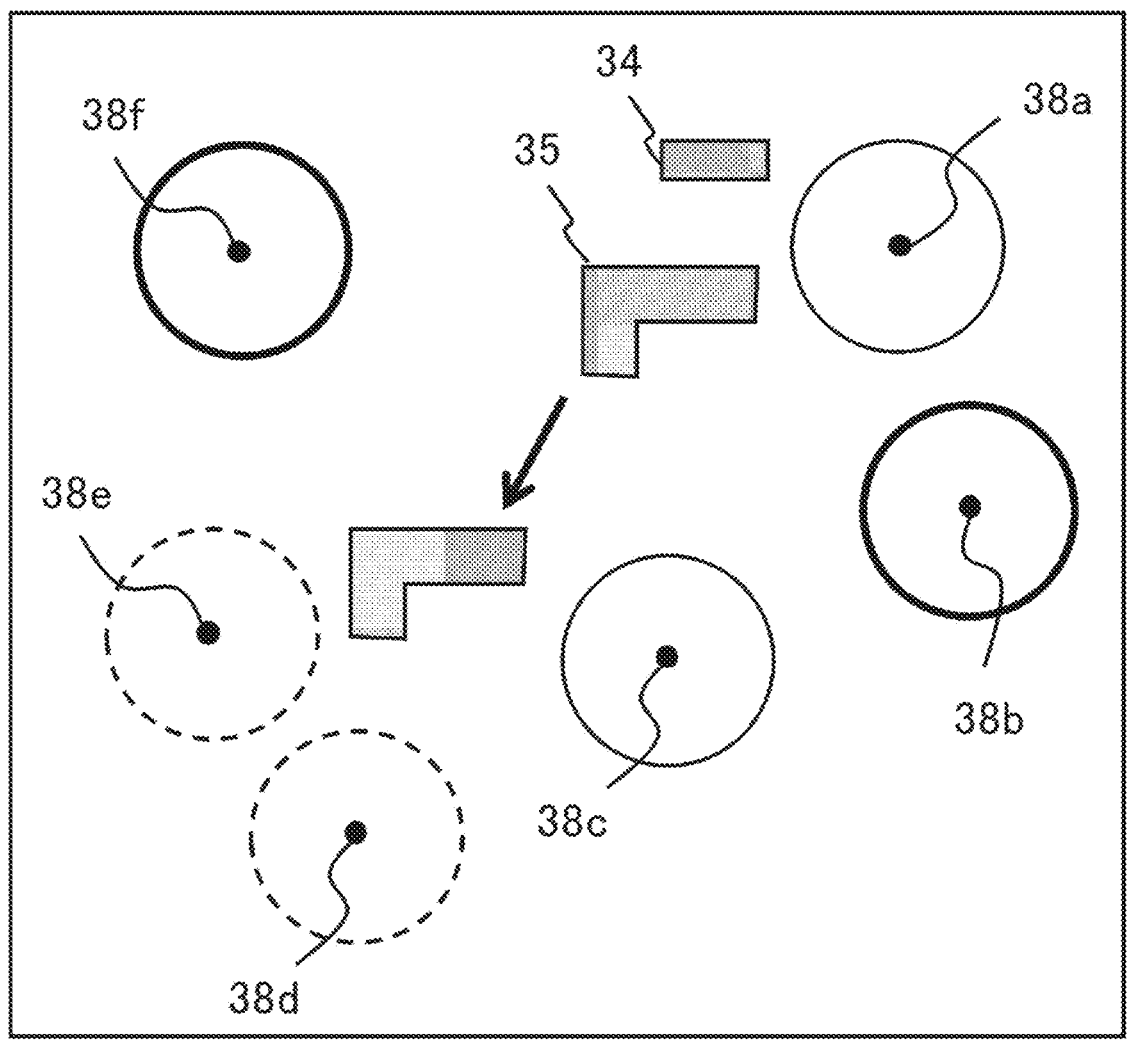
FIG. 13 is a diagram for describing a mode of switching a reference image to be used for generation of a display image in response to a movement of an object in the present embodiment.

Although the example of FIG. 12 assumes that a display image is generated using all of prepared reference images, after reference images are generated with reference points of view fixed, the reference image to be used for generation of a display image may be switched in response to a movement of an object. FIG. 13 is a diagram for describing a mode in which a reference image to be used for generation of a display image is switched in response to a movement of an object. The representing way of the illustration is similar to that of FIG. 12. In particular, in the virtual space, objects 34 and 35 exist, and the latter moves as indicated by an arrow mark.

The reference image generation apparatus 300 sets fixed reference points of view 38a to 38f so as to cover the moving range of the objects and generates reference images of them in advance. On the other hand, the display image generation apparatus 200 switches the reference image to be used for display in response to the movement of an object. For example, at an initial position of the object 35, reference images indicated by solid lines (reference images of the reference points of view 38a, 38b, 38c, and 38f) are used for generation of a display image. On the other hand, at positions after the movement, reference images indicated by broken lines (reference images of the reference points of view 38d and 38e) are added to a referring destination at the time of display image generation and reference images indicated by thick solid lines (reference images of the reference points of view 38b and 38f) are excluded simultaneously from a referencing target.

At this time, for example, it is assumed that a reference image corresponding to each reference point of view whose distances from the objects 34 and 35 are smaller than a threshold value is used for generation of a display image. Even in this way, the objects can be presented with a stabilized level of detail similarly as in a case where substantially a reference point of view is moved. Further, since videos themselves of the reference images are free from movement of a point of view, a region that indicates a change between frames is restricted and the compression efficiency increases. However, since it is necessary to provide a comparatively many reference points of view, the number of videos of reference images is inclined to increase.

As described above, a reference image is basically configured as video data. Accordingly, it is possible to store data into the reference image data storage unit 256 or transmit data utilizing a general compression encoding method for video data such as MPEG (Moving Picture Experts Group). Alternatively, in a case where an omnidirectional image is represented by an equidistant cylinder, the data may be converted into and compressed to coefficients of a general spherical harmonic function. Further, the data may be compressed for each frame using a general compression encoding method for still picture data such as JPEG (Joint Photographic Experts Group).

Figure 14:
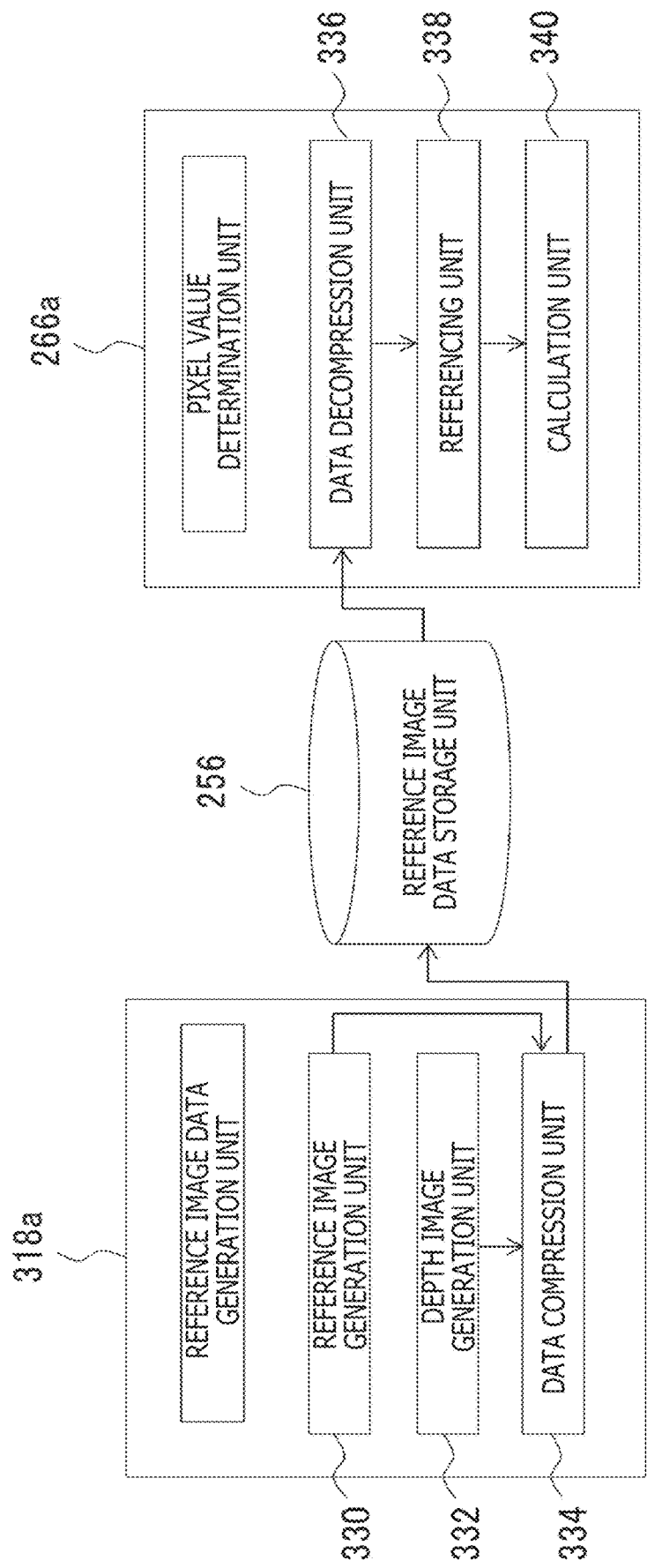
FIG. 14 is a diagram illustrating a configuration of functional blocks of a reference image data generation unit of the reference image generation apparatus and a reference value determination unit of the display image generation apparatus in a case where a compression/decompression processing function of data of a reference image is introduced in the present embodiment.

On the other hand, since the present embodiment has such characteristics that videos of a reference image and a depth image are paired with each other, that videos of a plurality of reference points of view to be synchronized with each other are made a storage target, and so forth, the effect can be increased by introducing a specific compression technique. FIG. 14 illustrates a configuration of functional blocks of a reference image data generation unit of the reference image generation apparatus 300 and a pixel value determination unit of the display image generation apparatus 200 in a case where a compression/decompression processing function of data of a reference image is introduced.

In this mode, the reference image data generation unit 318a includes a reference image generation unit 330, a depth image generation unit 332 and a data compression unit 334. The reference image generation unit 330 and the depth image generation unit 332 generate data of a reference image and a depth image as described hereinabove. In particular, the reference image generation unit 330 and the depth image generation unit 332 generate a moving image of a reference image representing a state of a space from each reference point of view set by the reference point-of-view setting unit 310 and a moving image of a depth image representing a distance value. Here, the reference points of view may be fixed or part of the reference points of view may be moved in response to a movement of an object.

The data compression unit 334 compresses a reference image and a depth image generated at a predetermined rate with respect to the time axis in such a manner as described above in accordance with a predetermined rule. In particular, the data compression unit 334 carries out at least one of the following processes.

(1) A reference image and a depth image at a same time step are compressed as occasion demands, and an integrated moving image that represents the reference image and the depth image as an image for one frame is generated (2) Only a region that indicates some change in a reference image and a depth image is represented as time series data.

The data compression unit 334 stores data compressed in such a manner as described above into the reference image data storage unit 256. On this occasion, one frame of an integrated image or an image in a region that indicates a change may be further compressed by JPEG. Alternatively, a video of an integrated image may be compressed by MPEG. On the other hand, the pixel value determination unit 266a includes a data decompression unit 336, a referring unit 338 and a calculation unit 340. The data decompression unit 336 reads out data of reference images at each time step from the reference image data storage unit 256 and decompresses the data to decode reference images and depth images.

In particular, in a case where the data is in a compressed state by the compression (1) above, the data decompression unit cuts out a reference image and a depth image from each frame of the integrated moving image and enlarges them as occasion demands. In the case where the data is in a compressed state by the compression (2) above, a region of a preceding frame in which a change is indicated is updated using time series data. In the case where both of the compressions of (1) and (2) are carried out simultaneously, both of them are carried out also in the case of decompression.

The referring unit 338 uses the depth images in the time steps restored in such a manner as described above to select a reference image representative of a point on an object of a drawing target for each pixel of the display image as described above to acquire pixel values of the reference image. Also, the calculation unit 340 determines pixel values of the display image by suitably weighting and averaging the pixel values acquired from the reference image of the referring destination.

Figure 15:
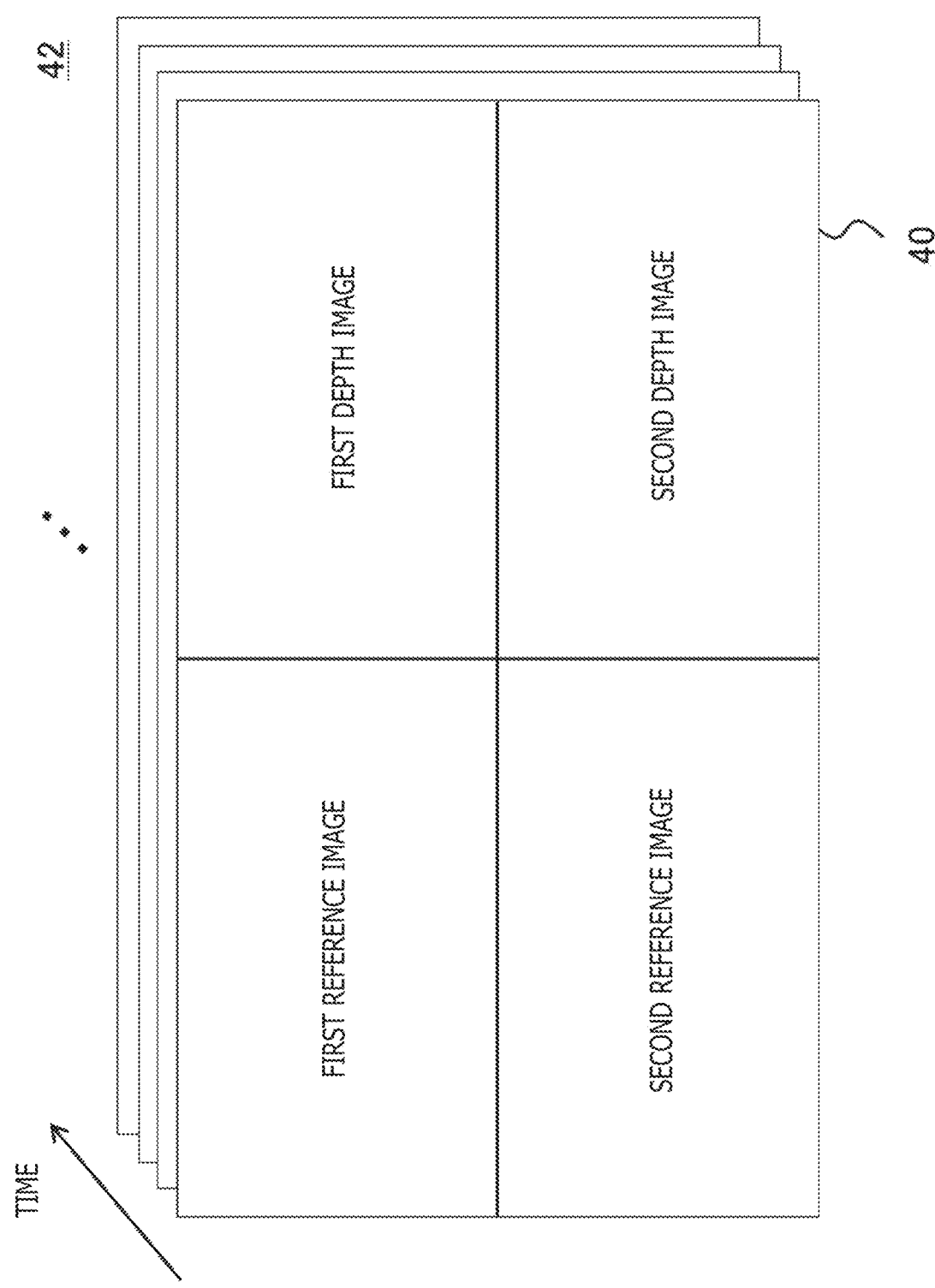
FIG. 15 is a diagram schematically illustrating another example of an integrated moving image generated by a data compression unit in the present embodiment.

FIG. 15 schematically illustrates an example of an integrated moving image generated by the data compression unit 334. The integrated moving image 42 has a data structure that represents, in four regions into which one frame 40 is divided, frames in a same time step in a "first reference image" and a "second reference image" generated for two reference points of view and a "first depth image" and a "second depth image" corresponding to the reference images. The data compression unit 334 suitably reduces frames of the reference images and the depth images in response to the size of an image face to be set to the integrated moving image 42 and connects the frames to such predetermined arrangement as illustrated in FIG. 15.

For example, in a case where the integrated moving image 42 is set to a size same as that of the original frames of the reference images and the depth images, the data compression unit 334 reduces the frames of the reference images and the depth images to ½ in both of the horizontal and vertical directions. Furthermore, the data compression unit 334 associates the position coordinates of two reference points of view integrated as an integrated moving image with each other as additional data of the moving images. The processes described correspond to converting data for two rows in the data of the reference mages illustrated in FIG. 11 into one moving image.

Since this can reduce the size of the entire data of the reference images, the transmission bandwidth and the capacity of the storage apparatus can be saved. Further, since four kinds of videos can be decoded and decompressed at a time, even if a large number of reference points of view are set, a parallel process for restoration is facilitated. Furthermore, since the four kinds of data can be synchronized with each other automatically, even if data of all reference points of view are taken into consideration, the synchronization process can be simplified. It is to be noted that the number of reference points of view to be integrated by one integrated moving image 42 is not limited to two and may be greater than that depending upon the reduction ratio permissible to the images.

Figure 16:
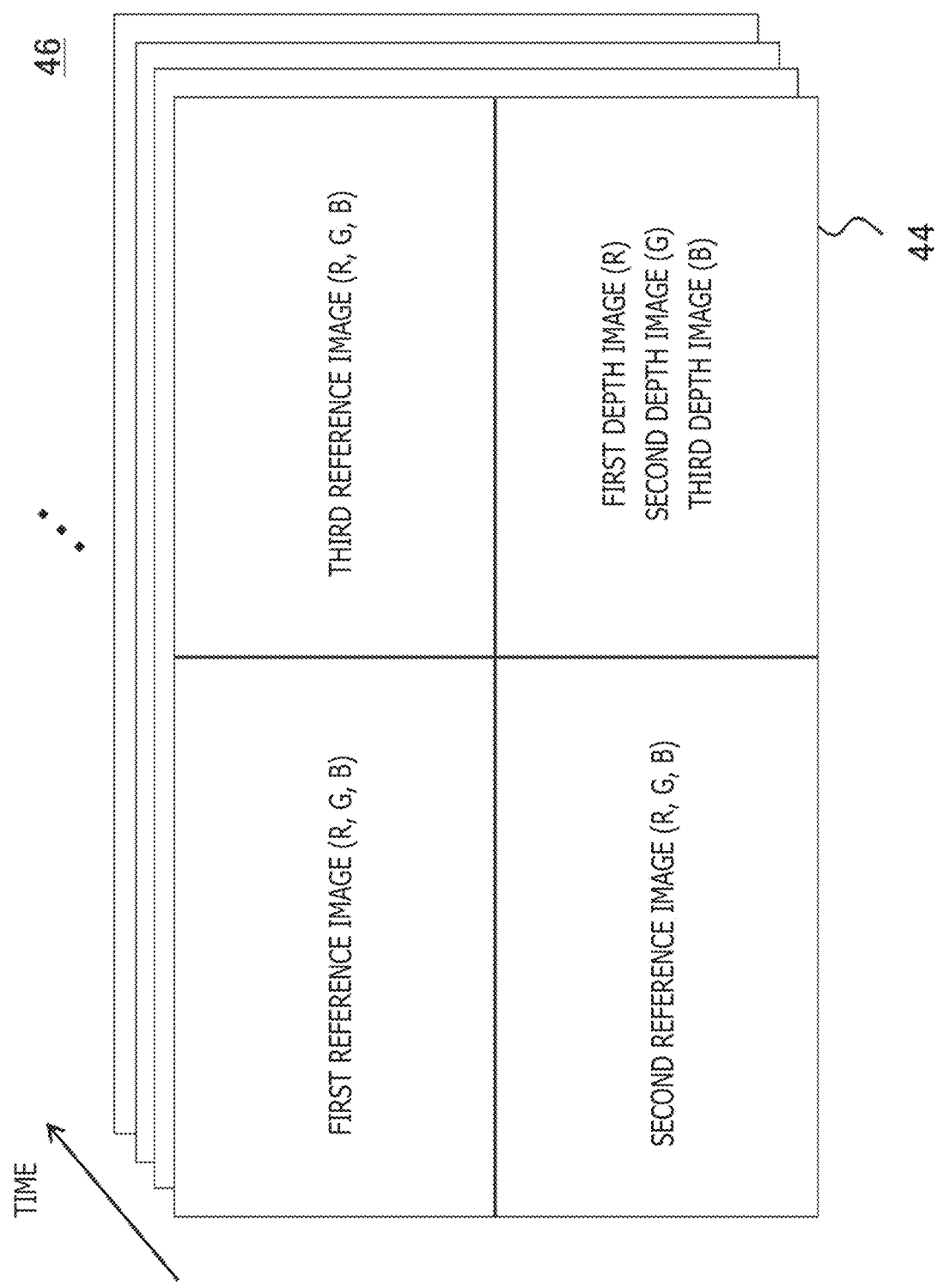
FIG. 16 is a diagram schematically illustrating another example of an integrated moving image generated by the data compression unit in the present embodiment.

FIG. 16 schematically illustrates another example of an integrated moving image generated by the data compression unit 334. The integrated moving image 46 has a data structure that represents, in four regions into which one frame 44 is divided, a frame in a same time step in a "first reference image," a "second reference image," and a "third reference image" generated for three reference points of view, and a frame of a "first depth image," a "second depth image," and a "third depth image" corresponding to the reference images.

In the case of the integrated moving image 42 illustrated in FIG. 15, since the "first depth image" and the "second depth image" are represented in different regions from each other of an image face, the channels and the gradations to be used are not limited. On the other hand, in the integrated moving image 46 illustrated in FIG. 16, the "first depth image," "second depth image" and "third depth image" are represented in a same region of the image face utilizing the three channels of red (R), green (g) and blue (B).

Therefore, three reference images can be represented in the remaining three regions.

According to such a data structure as just described, although the reduction rate of images is same as that in the case of FIG. 15, data of three reference points of view can be included in one video. As a result, while the picture quality is maintained, the synchronization process and the decoding decompression process can be further improved in efficiency. However, in a case where an RGB image is to be converted into a YCbCr image and then compression encoded, there is the possibility that, when the YCbCr image is decoded and decompressed by the display image generation apparatus 200, it cannot be restored fully by an influence of pixel values of a different depth image. Accordingly, it is desirable to adopt a compression encoding method that can restore RGB values with high accuracy.

Figure 17:
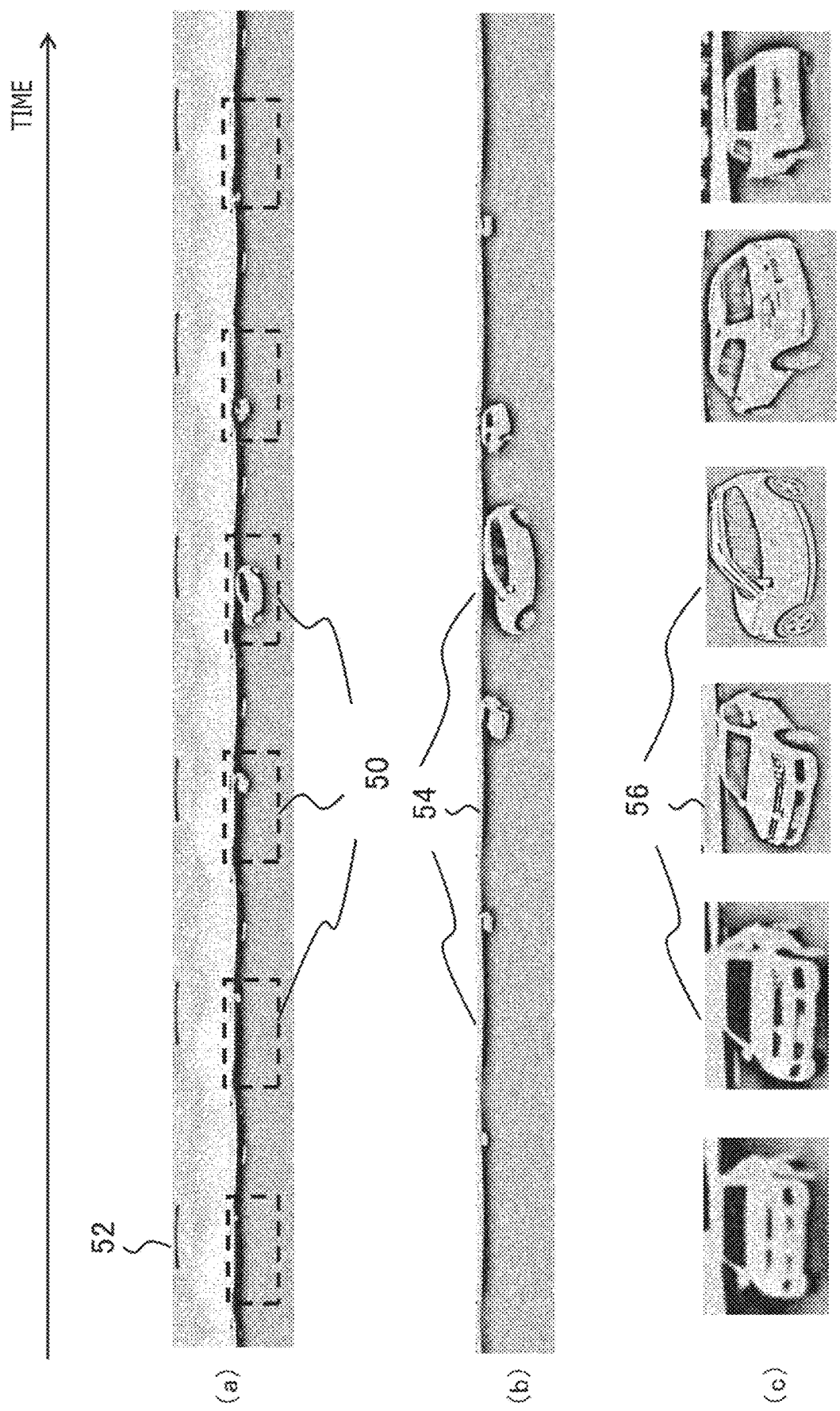
FIG. 17 is a diagram for describing a technique for converting only an image in a region having a change into time series data as one of compression processes carried out by the data compression unit in the present embodiment.

FIG. 17 is a diagram for describing a technique for converting only an image of a region that indicates a change into time series data as one of compression processes carried out by the data compression unit 334. This example assumes a moving image representative of an automobile running on a road, and (a) of FIG. 17 successively indicates reference images for six frames of the moving image with respect to time represented as an axis of abscissa. Here, each frame of the reference image represents an omnidirectional image as viewed from a reference point of view by an equidistant cylinder. In this case, the road and the background other than the automobile that is an object indicate little movement.

(b) of FIG. 17 illustrates a region (for example, a region 50) of a fixed size including the automobile extracted from the frames illustrated in (a) of FIG. 17. As described above, what changes in a video of a reference image is almost restricted to an extracted region as described hereinabove. Accordingly, the data compression unit 334 stores an entire region of a frame at a certain point of time, for example, of a frame 52, and stores, in regard to frames at later time steps, time series data of an image of a region of a predetermined size including an object (for example, of an image 54) and position information of the region on a reference image face in an associated relation with each other to obtain data of reference images after compression.

The data decompression unit 336 uses, in regard to a time step to which a reference frame is given, the reference frame as a reference image and successively updates, in regard to time steps after the time step, only a region stored as time series data to restore a reference image. It is to be noted that the images 54 in regions of the fixed size including the object may have a resolution higher than that of the image of the region 50 corresponding to the reference frame. According to this, even if the size of the reference frame is reduced to reduce the data size, the level of detail can be maintained in regard to a region of the object that is supposed to be gazed by the user. Further, the reference frame may be the first frame of each video or may be a frame after a predetermined interval of time.

Furthermore, (c) of FIG. 17 illustrates only extracted regions of a picture of an object, for example, only rectangular regions each having four sides at predetermined distances from the profile of the object. In this case, the size of a region to be extracted varies depending upon the positional relation between the reference point of view and the object. The data compression unit 334 determines a region from which a picture of the object is to be extracted and cut out from each frame of the reference image illustrated in (a) of FIG. 17. Then, a frame at a certain point of time, for example, the frame 52, is determined as a reference frame and the entire region of the reference frame is stored. In regard to the frame at each of the later time steps, time series data of an image of a region of a picture of the object (for example, of an image 56) and position information and size information of the region on a reference image plane in an associated relation with each other to obtain data of the reference image after compression.

Alternatively, in a stage in which the reference image generation unit 330 generates a reference image, an image representing only the object may be generated as the image 56. In this case, it is sufficient if the screen surface is adjusted such that the object is zoomed while the reference point of view remains fixed. Operation of the data decompression unit 336 is similar to that in the case of (b) of FIG. 17. The modes of (a) to (c) of FIG. 17 can be carried out similarly in regard not only to the reference image but also to the depth image. The compression methods to be applied to the reference image and the depth image may be same as each other or may be different from each other. According to the compression technique of (c) of FIG. 17, information of the object can be held at similar levels of detail without depending upon the distance between the reference point of view and the object.

Figure 18:
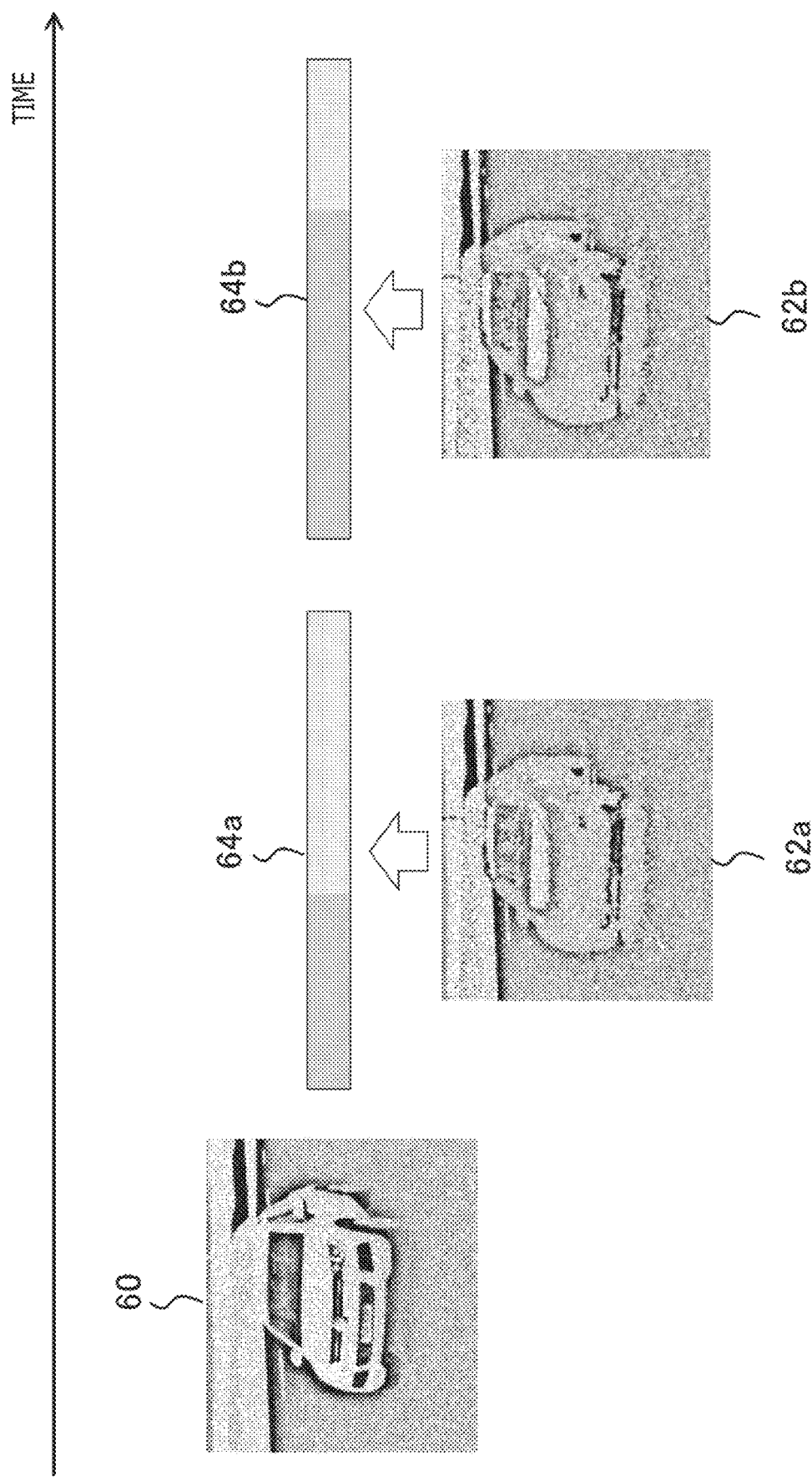
FIG. 18 is a diagram for describing a technique for converting information representative only of an image having a change into time series data as one of the compression processes carried out by the data compression unit in the present embodiment.

FIG. 18 is a diagram for describing a technique for determining information representing only pixels that indicate a change as time series data as one of compression processes carried out by the data compression unit 334. The axis of abscissa of FIG. 18 indicates time. First, an image 60 is one frame of a reference image or part of the one frame. Another image 62a corresponds to a next frame to the image 60, and pixels each having a pixel value different by a predetermined value or more from the pixel value of the image 60 are indicated by gray. A further image 62b corresponds to a further next frame, and similarly, pixels each having a pixel value different by more than a predetermined value or more from the pixel value of the preceding frame are indicated by gray.

The data compression unit 334 takes the difference between frames of the reference images and extracts pixels each having a pixel value that indicates a difference equal to or greater than a predetermined value between the frames. As a result, in the example illustrated, pixels representative of a front region of the vehicle including the bonnet and the bumper and a road surface in front of the automobile are extracted. Then, the data compression unit 334 generates images 64a and 64b that hold data (x, y, R, G, B) including position coordinates of the extracted pixels and pixel values after the change packed in a raster order. Here (x, y) are position coordinates of a pixel on the reference image plane, and (R, G, B) are a pixel value, namely, a color value, of the reference image.

In the case of a depth image, when (d) is a pixel value, that is, a distance value, of the depth image, an image is generated in which data (x, y, z) configured from the position coordinates of the extracted pixels and the pixel values after the change are packed in the raster order and stored as pixel values of the three channels. Then, using the image 60 as a reference frame, the entire region of it is stored, and in regard to frames of later time steps, the images 64a and 64b representing only information of each pixel that indicates a change is stored as time series data to obtain video data of the reference image after compression.

The data decompression unit 336 uses, in regard to a time step to which a reference frame is given, the reference frame as a reference image and successively updates, in regard to time steps after the time step, only pixels stored as time series data to restore a reference image. This similarly applies also to a depth image. Consequently, the data size can be reduced further from that of the mode illustrated in FIG. 17 taking the shape of an object into consideration. Note that the reference frame may be the first frame of each video or may be a frame after a predetermined interval of time. The mode of FIG. 17 and the mode of FIG. 18 may be combined suitably.

Figure 19:
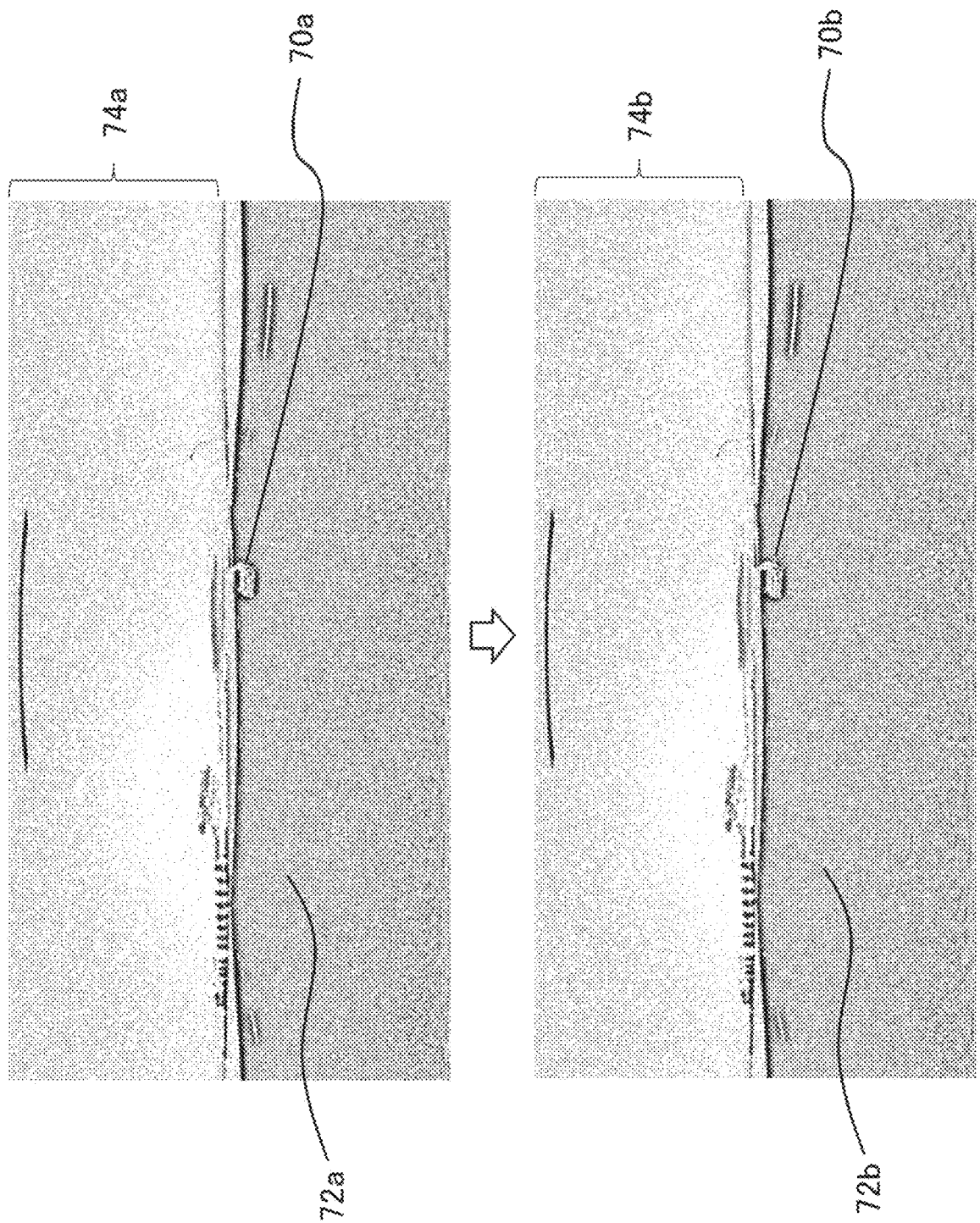
FIG. 19 is a diagram exemplifying two frames preceding and succeeding in a video of a reference image in the present embodiment.

FIG. 19 exemplifies two preceding and succeeding frames in a video of reference images. As described hereinabove, in a case where the number of main objects that move or deform in a space of a display target is restricted, a difference that appears between frames is restricted only to a small partial region. Even with the images in which the running automobile is illustrated in FIG. 19, between a frame in the upper stage and a frame in the lower stage, only a very small movement of the automobile between the pictures 70a and 70b and a very small change in reflection on the road surfaces 72a and 72b occur.

Further, in this example, regions 74a and 74b on the upper side than the road on an image plane are distant views. Different in nature from the surface of an object placed in a space of a display target, which is supposed in the present embodiment, the distant view is frequently free from the necessity that it be changed in response to a movement of the point of view of the user. Accordingly, an image at the predetermined reference point of view may be represented on a display image by texture mapping or the like. In other words, the necessity that data of an image of the region be held for each reference point of view is low. Utilizing such natures as described, the reference image and the depth image may be divided into tile images of a predetermined size such that the compression process is controlled in a unit of the tile image.

Figure 20:
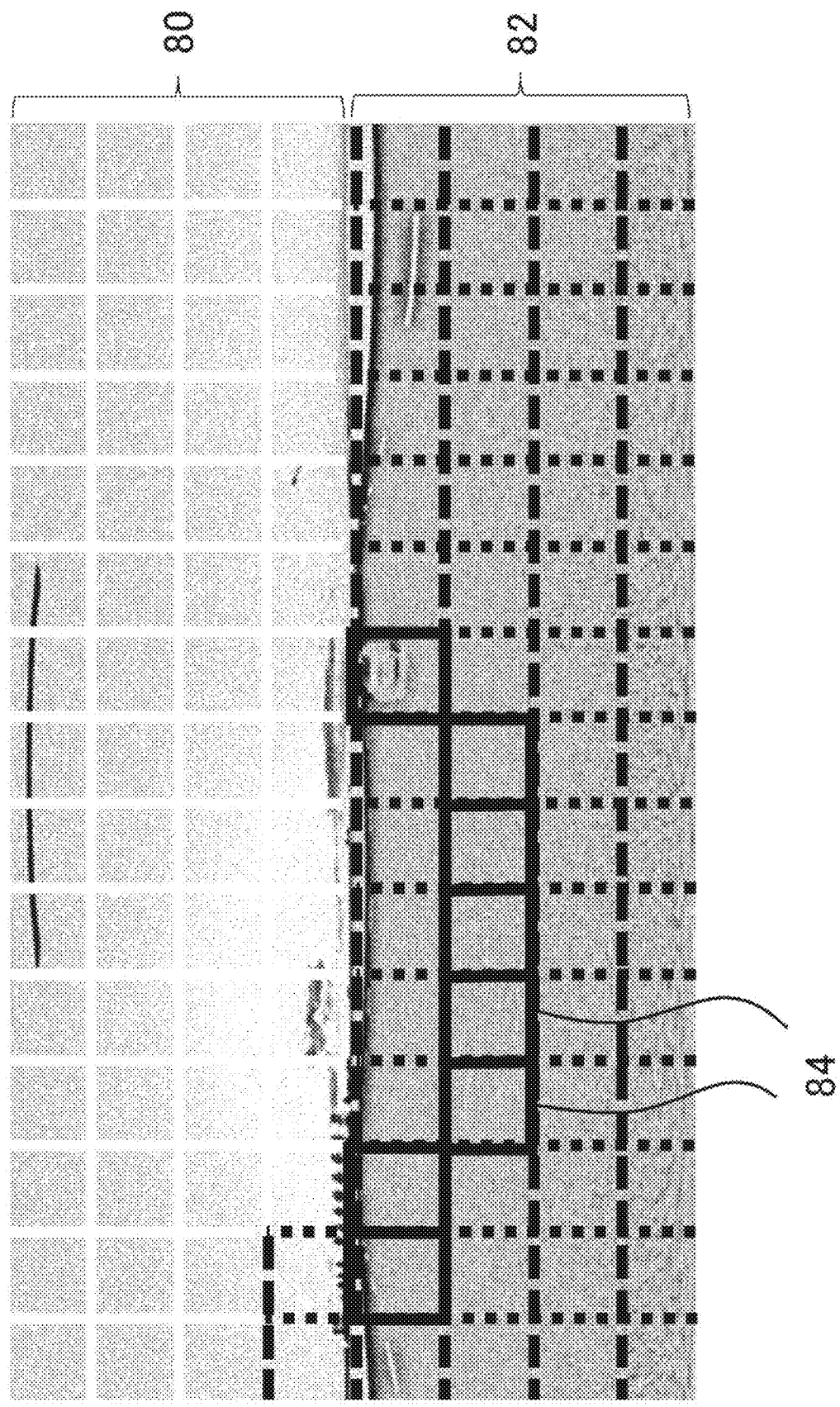
FIG. 20 is a diagram for describing a technique by which the data compression unit controls a compression process of a reference image in a unit of a tile image in the present embodiment.

FIG. 20 is a diagram for describing a technique for allowing the data compression unit 334 to control the compression process of a reference image in a unit of a tile image. The illustrated image corresponds to one frame illustrated in FIG. 19, and matrix-shaped rectangles partitioned into grids represent tile images. Since, among such tile images as just described, tile images included in a distant view region 80 and surrounded by white frames are free from the necessity to reflect a movement of the point of view of the user as described above, they are excluded from the data of the reference image for each reference point of view.

The remaining tile images surrounded by black lines are close views, that is, are included in a region 82 that is used for drawing of an object, and therefore, they are included as time series data in data of a reference image for each reference point of view. Otherwise, tile images in which a difference occurs from preceding frames like tile images surrounded by solid lines (for example, a tile image 84) may be extracted such that only the time series data are included in the data of the reference image. For example, when the average value of pixel values of tile images at a same position has a difference equal to or greater than a predetermined value between frames, it is decided that a difference from a preceding frame occurs and the tile image is extracted.

Alternatively, from within a tile image in which a difference from a preceding frame occurs (for example, the tile image 84), each pixel having a difference equal to or greater than a predetermined value from a preceding frame may be extracted such that an image representative of data configured from the position coordinates and the pixel value of the pixels is generated. This process is such as described hereinabove with reference to FIG. 18. Also, in regard to the depth image, it is possible to exclude data in a unit of a tile image and control the compression state. In the case where the entire depth images are handled as general video data, since it cannot be avoided, for example, to represent a distance value by 256 gradations of the SDR (Standard Dynamic Range), information after the decimal point is missed. If original pixel values (distance values) are stored as floating point data in a unit of a tile image, then the resolution of the distance values increases and a reference image to be used for drawing can be selected with high accuracy.

FIG. 21 illustrates an example of a structure of data after compression in the mode in which the compression process of a reference image and a depth image is controlled in a unit of a tile image. After-compression reference image data 350 is generated for each reference point of view and has a data structure that data of tile images are connected in a time series order in an associated relation with position coordinates of the tile image on the image plane (represented as "tile position"). In FIG. 21, the time series is an order of the "frame number" 0, 1, 2, . . . . For example, in a case where the tile image of the position coordinates (0, 0) or (1, 0) is included in a distant view region, since the image in the region is not used for drawing of an object, it is invalid as data of the reference image and is prepared separately in the form of texture data.

In FIG. 21, that data of a tile image is invalid is represented as "-."

On the other hand, in regard to a tile image included in a close view and having the possibility that it may be used for drawing of an object, data of a first frame (frame number "0") is included into data of a reference image first. In FIG. 21, the tile image is represented as "image a," "image b" or the like. In regard to succeeding frames, only in a case where a change occurs with the tile image, information representative of the change is included into the data of the reference image. In the example illustrated in FIG. 21, since tile images of position coordinates (70, 65) and (71, 65) indicate a change in the frame number "1," images "difference image c1" and "difference image d1" representative of such differences are included in the data of the reference image.

Since the tile image of the position coordinates (70, 65) indicates a difference also in the next frame, the "difference image c2" is included in an associated relation with the frame number "2." Here, the difference image is an image representative of the difference from a preceding frame, and, for example, they correspond to the images 64a and 64b of FIG. 18. Further, since the tile image of the position coordinates (30, 50) indicates a difference at the frame number "24" and the tile image of the position coordinates (31, 50) indicates a change at the frame number "25," images representative of the differences of them are included in the images "difference image a1" and "difference image b1," respectively.

The data decompression unit 336 of the display image generation apparatus 200 connects tile images associated with the frame number "0" to each other on the basis of their position coordinates to restore a reference image and a depth image of the frame. In regard to the succeeding frames, if pixel values represented as a difference value only in a tile region in which the difference image is included are updated, then the entire video of the reference image and the depth image can be restored fully.

Although the mode described till now assumes that an omnidirectional image as a reference image is represented by an equidistant cylinder, the present embodiment is not limited to this. FIG. 22 is a diagram for describing an image of a data compression process in a case where omnidirectional images of a reference image and a depth image are represented by a cube map. (a) of FIG. 22 illustrates a relation between an omnidirectional screen surface and a plane of a cube map. A face 362 of the cube map is a face that configures a cube that includes a spherical screen face 360 having a distance equal in all directions from a point of view 364.

A certain pixel 366 on the screen face 360 is mapped to a position 368 at which a straight line from the point of view 364 to the pixel 366 crosses with the face 362 of the cube map. Such a cube mapping method as just described is known as one of representation means of a panorama image.

In the present embodiment, a reference image and a depth image can be retained as data of a cube map. (b) of FIG. 22 illustrates a six-sided development view when a depth image at a certain reference point of view is represented by a cube map.

As described above, in a case where the reference image is a video, such image data as illustrated are generated at a predetermined rate. However, in a case where such a space as exemplified in FIGS. 17 to 20 is represented, a difference that appears from a preceding frame is restricted only to a region of a picture of the automobile indicated by an arrow mark in (b) of FIG. 22. If it is utilized that an image plane is originally segmented to six partitions, then the cube map can easily include only a face that indicates some movement (in the example illustrated, a face 370) as time series data into data of a reference image.

For example, if, in the data structure illustrated in FIG. 21, the tile images are replaced into the faces of a cube map and the "difference image" is an image of a face in which a difference from a preceding frame occurs, then operation of the data compression unit 334 and the data decompression unit 336 is same as that described above. As an alternative, a face of a cube map may be further divided into tile images such that it is decided in a unit of a tile image whether or not it is to be divided into data of a reference image. As another alternative, data representing only information relating to pixels that indicate a difference as illustrated in FIG. 18 in a face of a cube map that indicates a change from a preceding frame or a tile image that indicates a difference in the face of the cube map may be used as the "difference image."

In the case where a reference image and a depth image are represented by the equidistant cylinder, from the nature of the equidistant cylinder, a picture of an object just above or just below a point of view is extended in a horizontal direction at a lower portion or an upper portion of the image plane. Therefore, in a case where a change appears in such a region as described above in a space of a display target, it is considered that an image of an equidistant cylinder indicates a change over a wide range and the efficiency in data compression is deteriorated. According to the cube map method, since a change in an image plane is restricted to an area corresponding to the change in the space, the efficiency in data compression can be stabilized.

In the modes described above, principally a reference image and a depth image are generated in pair for each reference point of view, and they are compressed and decompressed similarly to each other and utilized for drawing an object. Here, the depth image is used to select, for each point on the object surface, a reference image to be referred to when the point is drawn. If this is calculated in advance and associated with a position on the object surface, then it becomes unnecessary to include a depth image itself into data of the reference image.

Figure 23:
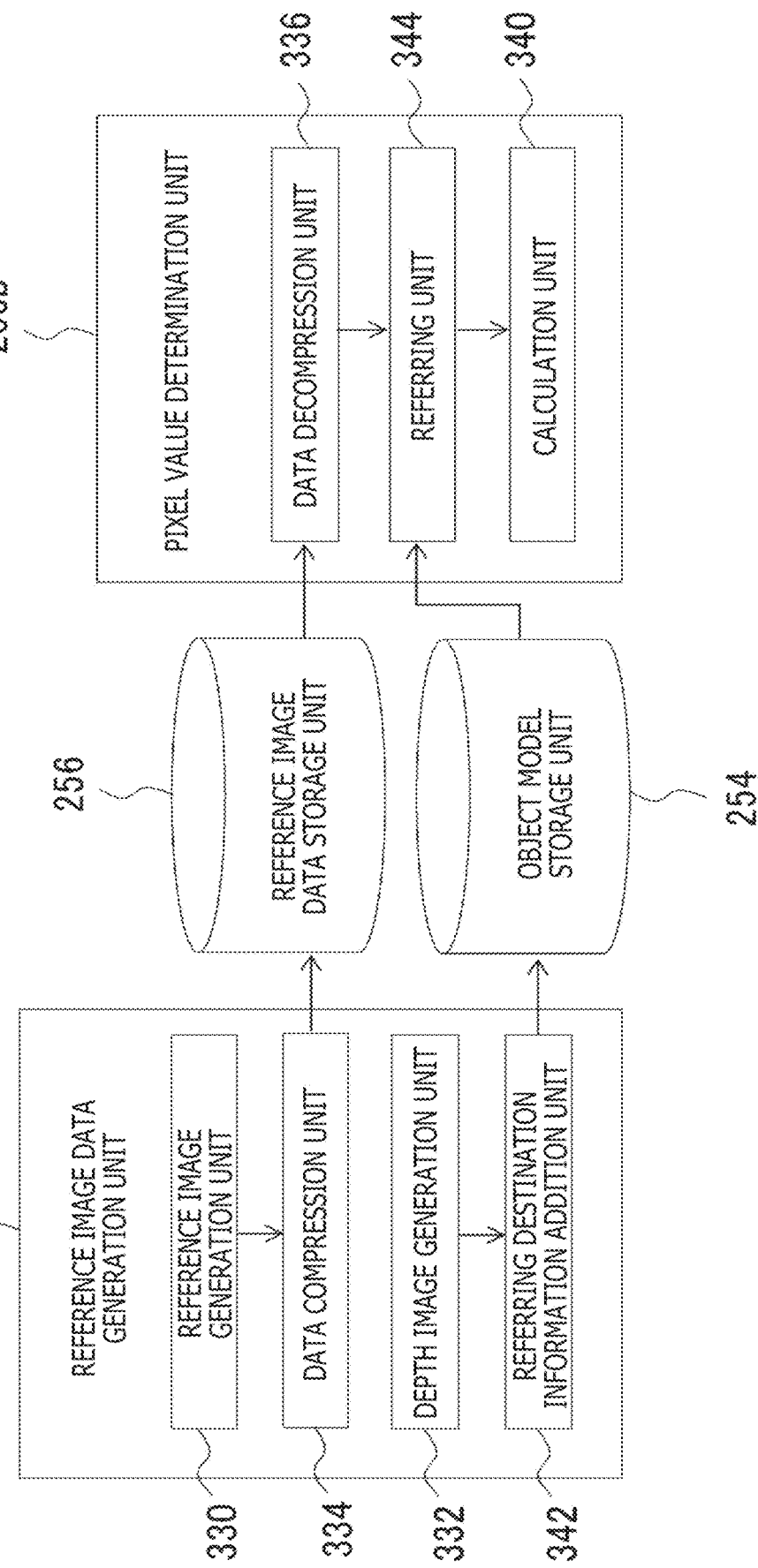
FIG. 23 is a diagram depicting a configuration of functional blocks of the reference image data generation unit of the reference image generation apparatus and the pixel value determination unit of the display image generation apparatus in a case where a function for storing information relating to a reference image of a referring destination in an associated relation with a position on the object surface is introduced.

FIG. 23 illustrates a configuration of functional blocks of the reference image data generation unit of the reference image generation apparatus 300 and the pixel value determination unit of the display image generation apparatus 200 in a case where a function for storing information relating to a reference image of a referring destination in an associated relation with positions on an object surface is introduced. In this mode, the reference image data generation unit 318b includes a reference image generation unit 330, a data compression unit 334, a depth image generation unit 332 and a referring destination information addition unit 342. Functions of the reference image generation unit 330, data compression unit 334 and depth image generation unit 332 are similar to those of the corresponding functional blocks illustrated in FIG. 14.

The referring destination information addition unit 342 uses a depth image generated by the depth image generation unit to generate information for designating, to a position on the object surface, a reference image to be referred to in order to draw the position. This process is basically similar to that illustrated in FIG. 8. In particular, a reference image in which a point on the object (such as a point 26 in FIG. 8) appears as a picture is determined by comparison between the distance to the object indicated by the depth image and the distance from the reference point of view in the space of the display target to the point.

However, in a case where a referring destination is selected at the time of display as described hereinabove with reference to FIG. 8, although a pixel of a drawing target in the display image is determined as a start point and a point corresponding to the start point is determined, the referring destination information addition unit 342 sets a unit region on the object surface for determining a referring destination by a predetermined rule. A particular example is hereinafter described. The referring destination information addition unit 342 writes identification information of the reference image of the referring destination determined in this manner in an associated relation with an object model stored in the object model storage unit 254.

In the case where the object moves or deforms, the appearance from the reference point also changes, and therefore, part of the identification of the reference image to be written into the object model becomes time serried data. By this configuration, when the display image generation apparatus 200 generates a display image, the necessity to refer to the depth image is eliminated. Accordingly, the data compression unit 334 compresses only the reference image generated by the reference image generation unit 330 by one of the techniques described hereinabove and stores the compressed reference image into the reference image data storage unit 256.

The pixel value determination unit 266b of the display image generation apparatus 200 includes a data decompression unit 336, a referring unit 344 and a calculation unit 340. Functions of the data decompression unit 336 and the calculation unit 340 are similar to those of the corresponding functional blocks illustrated in FIG. 14. However, the data decompression unit 336 performs the decompression process as described above only for a reference image stored in the reference image data storage unit 256. On the other hand, different from the referring unit 338 of FIG. 14, the referring unit 344 determines a reference image to be used to draw a point on an object corresponding to each pixel on the display image on the basis of information added to the object model. Then, from the determined reference image, the referring unit 344 acquires a pixel value representative of a picture of the point and supplies the pixel value to the calculation unit 340. By such a configuration as described above, the load of the processing of the referring unit 344 is reduced and the generation process of a display image can be speeded up. Further, since identification information of the reference image of the referring destination may be small in necessary gradations in comparison with the distance value of the depth mage, the data size even where time series data is used.

Figure 24:
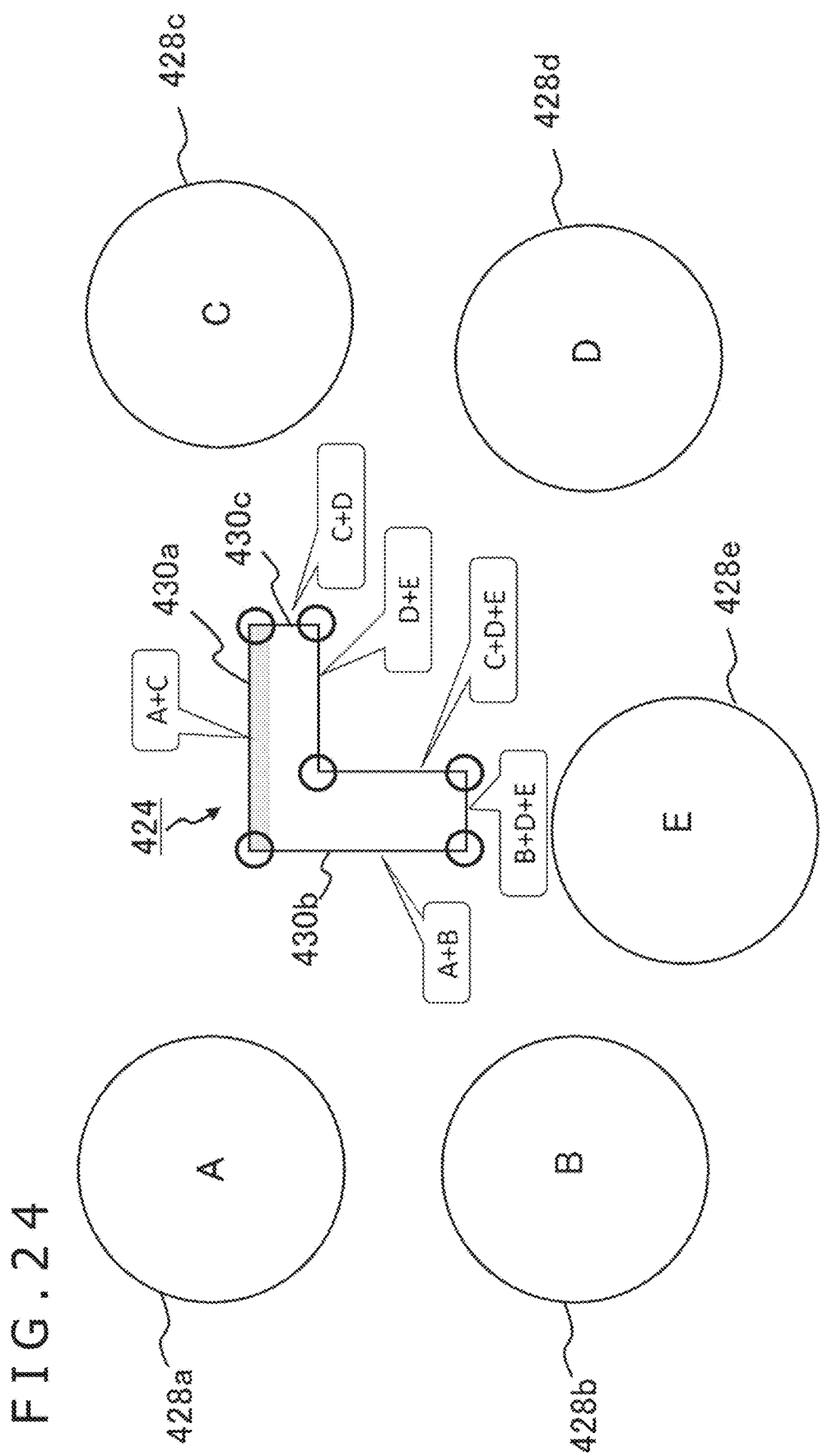
FIG. 24 is a diagram for describing an example of a technique for associating identification information of a reference image of a referring destination with an object model in the present embodiment.

FIG. 24 is a diagram for describing an example of a technique for associating identification information a reference image of a referring destination with an object model. The representing way of the illustration is similar to FIG. 8.

In particular, five reference points of view are set in a space in which an object 424 exists and reference images 428a, 428b, 428c, 428d, and 428e are generated. Identification information of the reference images (or reference points of view) is "A," "B," "C," "D," and "E." In this example, the referring destination information addition unit 342 associates identification information of a reference image to be referred to in a unit of a vertex of the object 424 indicated by a round mark or in a unit of a face (mesh) surrounded by straight lines interconnecting vertices.

It is turned out from the depth image that, for example, a face 430a of the object 424 appears in reference images of the identification information "A" and "C." Accordingly, the identification information "A" and "C" is associated with the face 430a. If it is turned out that a face 430b appears on reference images of the identification information "A" and "B," then the identification information "A" and "B" is associated with the face 430b. If it is turned out that a face 430c appears on reference images of the identification information "C" and "D," then the identification information "C" and "D" is associated with the face 430c.

Also, in regard to each of the other faces of the object, in which reference image a picture of the face appears is specified using a depth image, and the identification information is associated. In FIG. 24, associated identification information is indicated in a balloon from each face of the object 424. The referring unit 344 of the display image generation apparatus 200 specifies a face in which a point on the object corresponding to a pixel of a drawing target is included or a vertex in the proximity of the same and acquires identification information of the reference image associated with it. According to such a configuration as just described, since information can be added directly using information of a vertex or a mesh formed already as an object model, increase of the data size can be suppressed. Further, the load of processing at the time of display is low since the referring destination of the object model is restricted.

Meanwhile, since the granularity with which information of a face or a vertex is stored becomes great, in a case where a reference image of a referring destination changes on a same face by occlusion or the like, this cannot be represented accurately. In this case, although it seems a possible idea to determine only a reference image on which the entire face appears as a referring destination, it is supposed that this decreases the number of reference images to be used for drawing and degrades the quality of the display image. In order to maintain the picture quality, it is necessary to divide the face (mesh) for each of regions that have different referring destinations from each other and set information of a reference image in a unit of a region. However, this is disadvantageous in terms of the data size and the process load. From those, it is preferable for the illustrated technique to be applied to an object of a comparatively simple shape.

Figure 25:
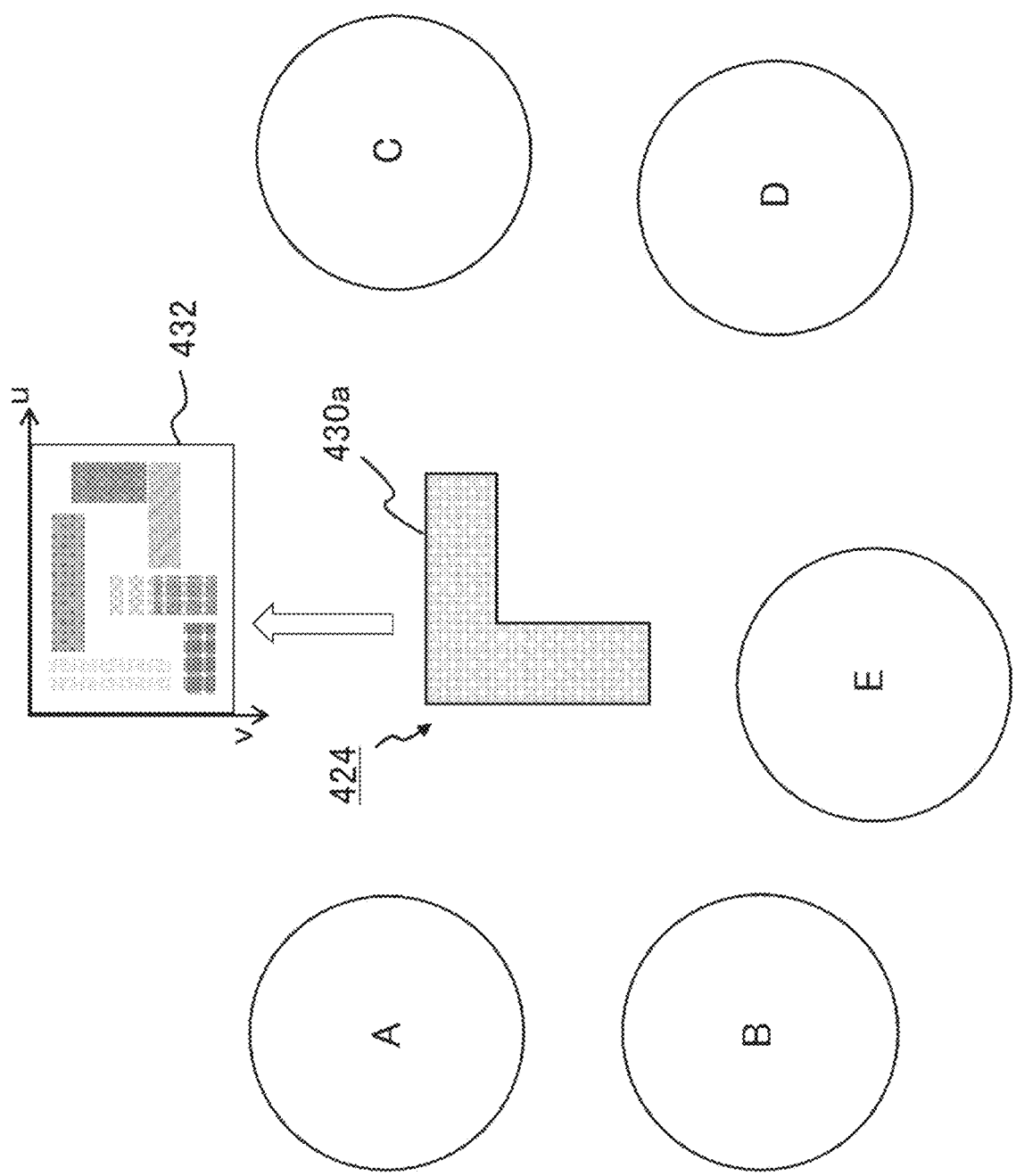
FIG. 25 is a diagram for describing another example of the technique for associating identification information of a reference image of a referring destination with an object model in the present embodiment.

FIG. 25 is a diagram for describing another example of the technique for associating identification information of a reference image of a referring destination with an object model. The representing way of the diagram is similar to that of FIG. 24. In this mode, identification information of a reference image of a referring destination is generated as a texture image. For example, for a face 430a of an object 424, a texture image 432 that represents identification information of a reference image of a referring destination as a pixel value for each position on the face. If the referring destination does not change in the face, then the pixel values of the texture image 432 are uniform. In the case where the reference image of a referring destination changes in the face by occlusion or the like, the pixel value of the texture image 432 changes so as to correspond to this. This makes it possible to control the referring destination with a granularity smaller than a unit of a face.

In this case, the referring unit 344 of the display image generation apparatus 200 specifies (u, v) coordinates on a texture image corresponding to a point on an object of a drawing target and reads out identification information of the reference image represented at the position. This process is basically similar to that of general texture mapping in computer graphics. According to such a configuration as described above, switching of the referring destination in a same face by occlusion or the like can be implemented with a light load without dividing a mesh defined by an object model.

Figure 26:
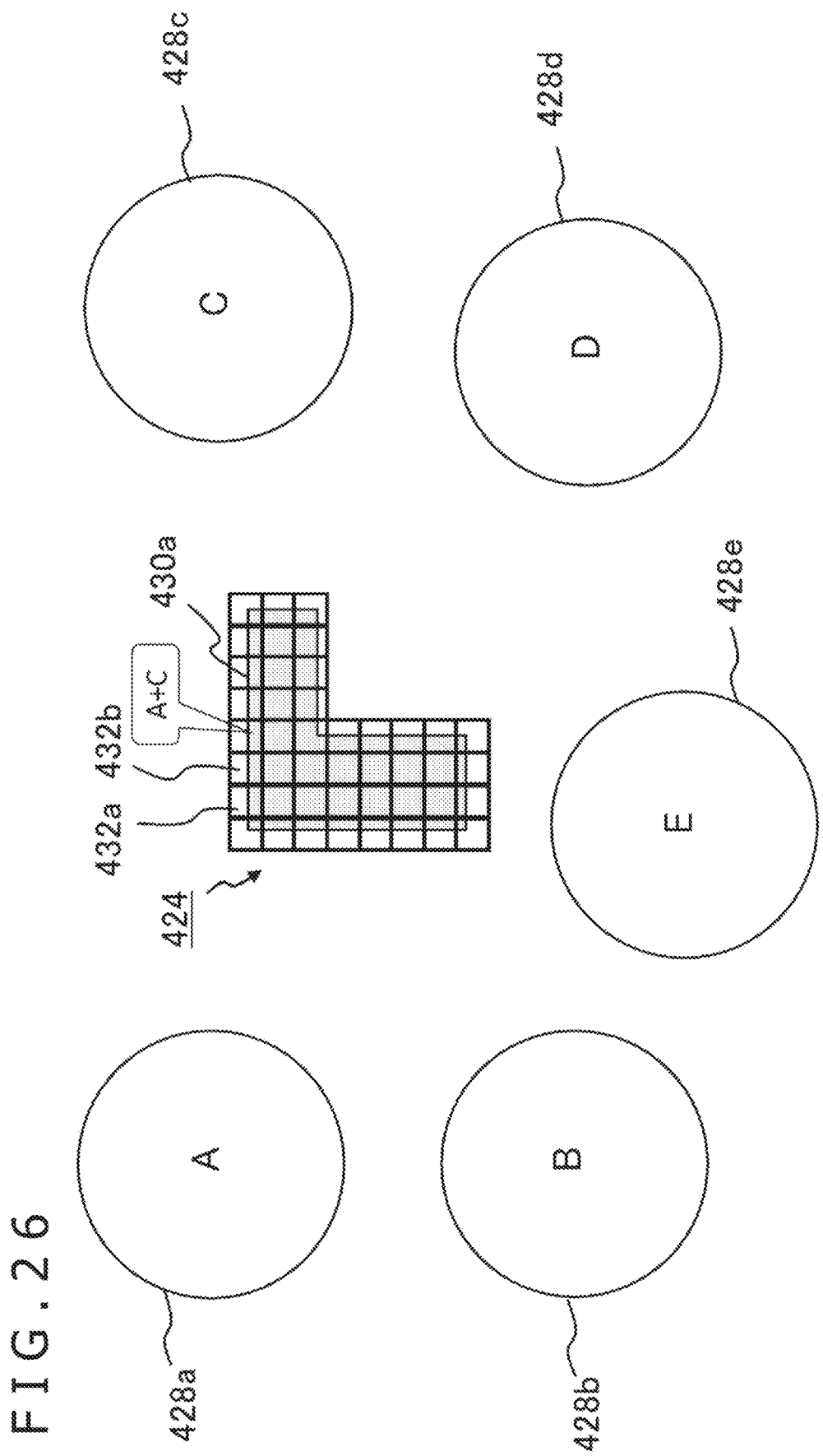
FIG. 26 is a diagram for describing a further example of the technique for associating identification information of a reference image of a referring destination with an object model in the present embodiment.

FIG. 26 is a diagram for describing a further example of the technique for associating identification information of a reference image of a referring destination with an object model. The representing way of the illustration is similar to that of FIG. 24. In this mode, an object is divided into voxels of a predetermined size and identification information of a reference image to be referred to is associated in a unit of the voxel. For example, in a case where a face 430a of an object 242 appears in reference images of identification information "A" and "C," voxels including the face 430a (for example, the voxels 432a and 432b) are associated with the identification information "A" and "C." This similarly applies also to voxels that include the other faces. In the case where two faces are included in one voxel, information of the referring destination is associated for each face.

If the referring destination does not indicate a change in the face, then information associated with voxels that include the reference destination is same. Even if the reference image of the referring destination changes in the face by occlusion or the like, by holding the information of the referring destination in a unit of a voxel, an appropriate referring destination can be obtained with a finer granularity. In this case, the referring unit 344 of the display image generation apparatus 200 specifies a voxel in which a point on an object of a drawing target is included and acquires identification information of a reference image associated with the voxel. According to such a configuration as described above, an image can be drawn with high accuracy by a unified data structure and process without depending upon the shape of the object and the complexity of the space.

It is to be noted that, in the illustrated example, a state in which voxels of a same size are viewed in a bird's eye view is represented by an aggregate of squares. On the other hand, the units of a three-dimensional space that associate identification information of a reference image to be referred to are not restricted to voxels of a same size. For example, space division by an octree that is widely known as one of techniques for efficiently searching for information to be associated with a position in a three-dimensional space may be introduced. This technique is a technique by which a space is represented by an octree structure by repeating, as occasion demands, such processes as to determine a space that becomes a target as a route box, divide the box into two in each of three-dimensional axial directions to form eight boxes and further divide each of the boxes into eight boxes.

By changing the number of times of division depending upon the position, the size of boxes to be formed finally can be controlled by the locality of the granularity of the space that associates with information. Further, the relation between index numbers allocated to the boxes and positions in the space is turned out readily by simple bit calculation. In this case, the referring unit 344 of the display image generation apparatus 200 can specify identification information of a reference image associated with a box in which a point on the object of the drawing target is included at a high speed by acquiring the index number of the box by bit calculation.

According to the present embodiment described above, in the technology for appreciating a moving image from any point of view, together with data that specifies a movement of an object in a virtual space, moving images when the movement is viewed from a plurality of reference points of view are prepared in advance as reference images. Then, at the time of display, the object is projected at a given time step to a view screen based on the point of view of a user, and from the reference image at each time, values of pixels representative of the same object are acquired to determine pixel values of a display image. For calculation of the pixel values, rules based on the positional relation between an actual point of view and the reference point of view and an attribute of the object are introduced.

Since a reference image can be generated over time at a timing different from that of display according to a point of view, a reference image of high quality can be prepared. At the time of display, since values are extracted from the image of high quality, an image of high quality can be presented without taking time. Here, if the reference point of view is moved so as to follow up the movement of the object, then the level of detail of the object on the reference image can be made fixed, and also in the display image, a picture of the object can be represented stably with high quality.

Further, by extracting only a region that indicates a change from a moving image of a reference image and a depth image to be used for selection of a reference image of a referring destination at the time of display and converting the region into time series data, even for display of the moving image, the size of necessary data can be suppressed. Furthermore, by generating data of an integrated moving image in which corresponding frames of a reference image and a depth image are included in a same frame and compression encoding the data in a unit of the moving image, the load of the decoding process and the synchronization process at the time of display can be reduced.

Furthermore, in order to determine a reference image of a referring destination, in place of data of a depth image, a reference image of a referring destination is determined for a position of the object surface and identification information of the reference image with an object model. This can further reduce the size of data necessary for display. Further, at the time of display, since the process for determining a reference image of a referring destination by calculation can be omitted, the time from acquisition of the point of view of the image to display can be reduced.

The present invention has been described on the basis of the embodiment. It can be recognized by those skilled in the art that the embodiment is exemplary and various modifications are possible in the combination of the components and the processes of the embodiment and that such modifications fall within the scope of the present invention.

REFERENCE SIGNS LIST

100 Head-mounted display, 200 Display image generation apparatus, 222 CPU, 224 GPU, 226 Main memory, 236 Output unit, 238 Input unit, 254 Object model storage unit, 256 Reference image data storage unit, 260 Point-of-view information acquisition unit, 262 Space construction unit, 264 Projection unit, 266 Pixel value determination unit, 268 Output unit, 300 Reference image generation apparatus, 310 Reference point-of-view setting unit, 314 Object model storage unit, 316 Space construction unit, 318 Reference image data generation unit, 330 Reference image generation unit, 332 Depth image generation unit, 334 Data compression unit, 336 Data decompression unit, 338 Referring unit, 340 Calculation unit, 342 Referring destination information addition unit, 344 Referring unit

INDUSTRIAL APPLICABILITY

As described above, the present invention can be utilized in various information processing apparatus such as a head-mounted display, a game device, an image display apparatus, a portable terminal and a personal computer, an information processing system that includes any of them and so forth.

The invention claimed is:

1. An apparatus configured to display a virtual environment and comprising:
a memory;
a display; and
processing circuitry configured to:
store video data of the virtual environment, to include video data of a reference image representative of a picture of a space in the virtual environment that includes an object represented by a plurality of pixels,
wherein the video data of the reference image includes video data corresponding to a plurality of reference points of view in the virtual environment;
compare a point of view of a user to the plurality of reference points of view; and
display a picture of the virtual environment, including a picture of the object, from the point of view of the user;
wherein, based on the point of view of the user not being the same as any of the plurality of reference points of view, the picture of the object that is viewed from the point of view of the user is formed by an image averaging process that includes:
retrieving from the stored video data:
a first set of pixel-specific colors of the object as viewed from a first reference point of view of the plurality of reference points of view that is closest to the point of view of the user in a first direction, and
a second set of pixel-specific colors of the object as viewed from a second reference point of view of the plurality of reference points of view that is second closest to the point of view of the user in a first direction; and
setting pixel-specific colors of the object as viewed from the point of view of the user based on a weighted average of the first set of pixel-specific colors and the second set of pixel-specific colors,
wherein the weighted average is based on:
a first distance between the point of view of the user and the first reference point of view, and
a second distance between the point of view of the user and the second reference point of view,
wherein the first and second distances comprise first and second linear distances, and
wherein the weighted average of the first set of pixel-specific colors and the second set of pixel-specific colors comprises, for each pixel, a pixel-specific weighted color $C = w_1 c_1 + w_2 c_2$, where $w_1+w_2=1$, $c_1$=a pixel-specific color from the first reference point of view, $c_2$=a pixel-specific color from the second reference point of view, $w_1=(1/\Delta a^2)/\text{sum}$, $w_2=(1/\Delta b^2)/\text{sum}$, $\text{sum}=1/\Delta a^2+1/\Delta b^2$, $\Delta a$=the first distance, and
$\Delta b$=the first distance.

2. A method performed by an apparatus configured to display a virtual environment, wherein the apparatus stores video data of the virtual environment, to include video data of a reference image representative of a picture of a space in the virtual environment that includes an object represented by a plurality of pixels, wherein the video data of the reference image includes video data corresponding to a plurality of reference points of view in the virtual environment, the method comprising:

comparing a point of view of a user to the plurality of reference points of view; and displaying a picture of the virtual environment, including a picture of the object, from the point of view of the user;

wherein, based on the point of view of the user not being the same as any of the plurality of reference points of view, the picture of the object that is viewed from the point of view of the user is formed by an image averaging process that includes:

retrieving from the stored video data:
    a first set of pixel-specific colors of the object as viewed from a first reference point of view of the plurality of reference points of view that is closest to the point of view of the user in a first direction, and
    a second set of pixel-specific colors of the object as viewed from a second reference point of view of the plurality of reference points of view that is second closest to the point of view of the user in a first direction; and setting pixel-specific colors of the object as viewed from the point of view of the user based on a weighted average of the first set of pixel-specific colors and the second set of pixel-specific colors, wherein the weighted average is based on:
    a first distance between the point of view of the user and the first reference point of view, and
    a second distance between the point of view of the user and the second reference point of view, wherein the first and second distances comprise first and second linear distances, and wherein the weighted average of the first set of pixel-specific colors and the second set of pixel-specific colors comprises, for each pixel, a pixel-specific weighted color $C=w_1c_1+w_2c_2$, where $w_1+w_2=1$, $c_1$=a pixel-specific color from the first reference point of view, $c_2$=a pixel-specific color from the second reference point of view, $w_1=(1/\Delta a^2)/\text{sum}$, $w_2=(1/\Delta b^2)/\text{sum}$, $\text{sum}=1/\Delta a^2+1/\Delta b^2$, $\Delta a$=the first distance, and
$\Delta b$=the first distance.

3. A non-transitory computer readable medium containing a program for causing an apparatus configured to display a virtual environment to perform a process, wherein the apparatus stores video data of the virtual environment, to include video data of a reference image representative of a picture of a space in the virtual environment that includes an object represented by a plurality of pixels, wherein the video data of the reference image includes video data corresponding to a plurality of reference points of view in the virtual environment, the process comprising:

comparing a point of view of a user to the plurality of reference points of view; and displaying a picture of the virtual environment, including a picture of the object, from the point of view of the user;

wherein, based on the point of view of the user not being the same as any of the plurality of reference points of view, the picture of the object that is viewed from the point of view of the user is formed by an image averaging process that includes:

retrieving from the stored video data:
    a first set of pixel-specific colors of the object as viewed from a first reference point of view of the plurality of reference points of view that is closest to the point of view of the user in a first direction, and
    a second set of pixel-specific colors of the object as viewed from a second reference point of view of the plurality of reference points of view that is second closest to the point of view of the user in a first direction; and setting pixel-specific colors of the object as viewed from the point of view of the user based on a weighted average of the first set of pixel-specific colors and the second set of pixel-specific colors, wherein the weighted average is based on:
    a first distance between the point of view of the user and the first reference point of view, and
    a second distance between the point of view of the user and the second reference point of view, wherein the first and second distances comprise first and second linear distances, and wherein the weighted average of the first set of pixel-specific colors and the second set of pixel-specific colors comprises, for each pixel, a pixel-specific weighted color $C=w_1c_1+w_2c_2$, where $w_1+w_2=1$, $c_1$=a pixel-specific color from the first reference point of view, $c_2$=a pixel-specific color from the second reference point of view, $w_1=(1/\Delta a^2)/\text{sum}$, $w_2=(1/\Delta b^2)/\text{sum}$, $\text{sum}=1/\Delta a^2+1/\Delta b^2$, $\Delta a$=the first distance, and
$\Delta b$=the first distance.

4. The apparatus of claim 1, wherein
the first distance between the point of view of the user and the first reference point of view comprises a first angle $\theta_a$, and the second distance between the point of view of the user and the second reference point of view comprises a second angle $\theta_a$, where $0<\theta_a \leq \theta_b \leq 90$.

5. The apparatus of claim 4, wherein the weighted average of the first set of pixel-specific colors and the second set of pixel-specific colors comprises, for each pixel, a pixel-specific weighted color $C=w_1 c_1 + w_2 c_2$, where $w_1 + w_2 = 1$, $c_1$=a pixel-specific color from the first reference point of view, $C_2$=a pixel-specific color from the second reference point of view, the point of view of the user comprises a point of view gaze vector (Vr), the first reference point of view comprises a first reference point of view gaze vector (Va), the second reference point of view comprises a first reference point of view gaze vector (Vb), $w_1$=(Va times Vr)/((Va times Vr)+(Vb times Vr)), and $w_2$=(Vb times Vr)/((Va times Vr)+(Vb times Vr)).

6. The apparatus of claim 1, wherein the first and reference points of view comprise points of view that are not obstructed by a feature of the object.

7. The apparatus of claim 1, wherein the plurality of reference points of view comprise a first plurality of reference points of view on a first plane corresponding to an eye level of a virtual user when the virtual user is standing, and a first plurality of reference points of view on a second plane parallel to the first plane and corresponding to an eye level of the virtual user when the virtual user is sitting.

8. The apparatus of claim 1, wherein the plurality of reference points of view comprise at least one reference point of view configured to move in the virtual environment in correspondence with a movement of the object in the virtual environment.

9. The apparatus of claim 1, wherein at least one first or second reference points of view are configured to move in the virtual environment in correspondence with a movement of the object in the virtual environment.

10. The apparatus of claim 1, wherein the image averaging process is performed based on each of the first and second distances exceeding a predetermined threshold value.

* * * * *